US008582598B2

(12) United States Patent
Binder

(10) Patent No.: US 8,582,598 B2
(45) Date of Patent: *Nov. 12, 2013

(54) LOCAL AREA NETWORK FOR DISTRIBUTING DATA COMMUNICATION, SENSING AND CONTROL SIGNALS

(75) Inventor: Yehuda Binder, Hod Ha'sharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,874

(22) Filed: Jan. 17, 2012

(65) Prior Publication Data
US 2012/0185908 A1 Jul. 19, 2012

Related U.S. Application Data

(60) Continuation of application No. 11/438,259, filed on May 23, 2006, now Pat. No. 8,121,132, which is a division of application No. 11/190,884, filed on Jul. 28, 2005, now Pat. No. 7,200,152, which is a continuation of application No. 09/349,020, filed on Jul. 7, 1999, now Pat. No. 6,956,826.

(51) Int. Cl.
*H04L 12/40* (2006.01)

(52) U.S. Cl.
USPC .................. 370/463; 370/503; 725/127

(58) Field of Classification Search
USPC ......... 370/200, 222–224, 254, 258, 293, 400, 370/404–406, 424, 452–456, 460, 463, 502, 370/503; 340/3.42–3.44; 379/107; 710/413; 725/127
See application file for complete search history.

(56) References Cited

U.S. PATENT DOCUMENTS

| | | | |
|---|---|---|---|
| 404,721 A | 6/1889 | Messer |
| 405,422 A | 6/1889 | Law et al. |
| 2,298,435 A | 10/1942 | Tunick |
| 2,680,162 A | 6/1954 | Brehm et al. |
| 3,370,125 A | 2/1968 | Shaw et al. |
| 3,539,727 A | 11/1970 | Pasternack |
| 3,541,541 A | 11/1970 | Engelbart |
| 3,659,277 A | 4/1972 | Brown |
| 3,699,523 A | 10/1972 | Percher |
| 3,702,460 A | 11/1972 | Blose |

(Continued)

FOREIGN PATENT DOCUMENTS

WO 0105092 1/2001

OTHER PUBLICATIONS

Wakerly, John, The Simple, Definitive Backplane and Timeslot Explanation; D.A.V.I.D. Systems, Inc., pp. 1-8, Sep. 1, 1984.

(Continued)

*Primary Examiner* — Edwin Holloway, III
(74) *Attorney, Agent, or Firm* — Browdy and Neimark, PLLC

(57) ABSTRACT

A network for carrying out control, sensing and data communications, composed of a plurality of nodes. Each node may be connected to a payload, which includes sensors, actuators and DTE's. The network is formed using a plurality of independent communication links, each based on electrically-conducting communication media composed of at least two conductors and interconnecting two nodes, in a point-to-point configuration. During network operation, nodes can be dynamically configured as either data-generating nodes, wherein data is generated and transmitted into the network, or as receiver/repeater/router nodes, wherein received data is repeated from a receiver port to all output ports.

56 Claims, 8 Drawing Sheets

(56) References Cited

U.S. PATENT DOCUMENTS

| | | |
|---|---|---|
| 3,717,858 A | 2/1973 | Hadden |
| 3,739,226 A | 6/1973 | Seiter et al. |
| 3,805,265 A | 4/1974 | Lester |
| 3,806,814 A | 4/1974 | Forbes |
| 3,835,334 A | 9/1974 | Notteau |
| 3,836,888 A | 9/1974 | Boenke et al. |
| 3,870,822 A | 3/1975 | Matthews |
| 3,872,319 A | 3/1975 | Platzer, Jr. |
| 3,922,490 A | 11/1975 | Pettis |
| 3,924,077 A | 12/1975 | Blakeslee |
| 3,959,772 A | 5/1976 | Wakasa et al. |
| 3,968,333 A | 7/1976 | Simokat et al. |
| 3,975,594 A | 8/1976 | Guntersdorfer |
| 4,012,734 A | 3/1977 | Jagoda et al. |
| 4,058,678 A | 11/1977 | Dunn et al. |
| 4,063,220 A | 12/1977 | Metcalfe et al. |
| 4,173,714 A | 11/1979 | Bloch et al. |
| 4,197,431 A | 4/1980 | Vis |
| 4,232,200 A | 11/1980 | Hestad et al. |
| 4,241,243 A | 12/1980 | Ball |
| 4,254,305 A | 3/1981 | Treiber |
| 4,272,759 A | 6/1981 | Handy |
| 4,303,912 A | 12/1981 | Stafford et al. |
| 4,303,993 A | 12/1981 | Panepinto, Jr. et al. |
| 4,330,687 A | 5/1982 | Foulkes et al. |
| 4,335,464 A | 6/1982 | Armstrong et al. |
| 4,339,750 A | 7/1982 | Delacruz |
| 4,339,816 A | 7/1982 | Reed |
| 4,367,557 A | 1/1983 | Stern et al. |
| 4,373,117 A | 2/1983 | Pierce |
| 4,381,427 A | 4/1983 | Cheal et al. |
| 4,389,694 A | 6/1983 | Cornwell, Jr. |
| 4,390,986 A | 6/1983 | Moses |
| 4,395,590 A | 7/1983 | Pierce et al. |
| 4,413,229 A | 11/1983 | Grant |
| 4,415,774 A | 11/1983 | Driver |
| 4,417,099 A | 11/1983 | Pierce |
| 4,417,242 A | 11/1983 | Bapst et al. |
| 4,431,869 A | 2/1984 | Sweet |
| 4,463,341 A | 7/1984 | Iwasaki |
| 4,467,314 A | 8/1984 | Weikel et al. |
| 4,477,896 A | 10/1984 | Aker |
| 4,484,185 A | 11/1984 | Graves |
| 4,490,683 A | 12/1984 | Rhee |
| 4,493,092 A | 1/1985 | Adams |
| 4,507,721 A | 3/1985 | Yamano et al. |
| 4,507,793 A | 3/1985 | Adams |
| 4,509,211 A | 4/1985 | Robbins |
| 4,510,493 A | 4/1985 | Bux et al. |
| 4,523,307 A | 6/1985 | Brown et al. |
| 4,534,039 A | 8/1985 | Dodds et al. |
| 4,535,401 A | 8/1985 | Penn |
| 4,543,450 A | 9/1985 | Brandt |
| 4,551,721 A | 11/1985 | Kozlik |
| 4,578,533 A | 3/1986 | Pierce |
| 4,578,537 A | 3/1986 | Faggin et al. |
| 4,580,276 A | 4/1986 | Andruzzi, Jr. et al. |
| 4,583,214 A | 4/1986 | Miyashita et al. |
| 4,592,069 A | 5/1986 | Redding |
| 4,593,389 A | 6/1986 | Wurzburg et al. |
| 4,621,170 A | 11/1986 | Picandet |
| 4,633,217 A | 12/1986 | Akano |
| 4,636,914 A | 1/1987 | Belli |
| 4,637,013 A * | 1/1987 | Nakamura .................. 370/221 |
| 4,639,714 A | 1/1987 | Crowe |
| 4,642,607 A | 2/1987 | Strom et al. |
| 4,647,725 A | 3/1987 | Dellinger et al. |
| 4,651,022 A | 3/1987 | Cowley |
| 4,661,952 A | 4/1987 | Von Sichart et al. |
| 4,665,544 A | 5/1987 | Honda et al. |
| 4,669,916 A | 6/1987 | White et al. |
| 4,670,874 A | 6/1987 | Sato et al. |
| 4,672,605 A | 6/1987 | Hustig et al. |
| 4,677,646 A | 6/1987 | Dodds et al. |
| 4,691,344 A | 9/1987 | Brown et al. |
| 4,710,917 A * | 12/1987 | Tompkins et al. ............ 709/204 |
| 4,714,912 A | 12/1987 | Roberts et al. |
| 4,719,616 A | 1/1988 | Akano |
| 4,724,435 A | 2/1988 | Moses et al. |
| 4,733,380 A | 3/1988 | Havira |
| 4,733,389 A | 3/1988 | Puvogel |
| 4,734,919 A | 3/1988 | Tae |
| 4,734,932 A | 3/1988 | Lott |
| 4,736,367 A | 4/1988 | Wroblewski et al. |
| 4,740,963 A | 4/1988 | Eckley |
| 4,742,538 A | 5/1988 | Szlam |
| 4,745,391 A | 5/1988 | Gajjar |
| 4,750,094 A | 6/1988 | Krasik |
| 4,755,792 A | 7/1988 | Pezzolo et al. |
| 4,761,646 A | 8/1988 | Choquet et al. |
| 4,766,402 A | 8/1988 | Crane |
| 4,772,870 A | 9/1988 | Reyes |
| 4,780,714 A | 10/1988 | Moustakas et al. |
| 4,782,322 A | 11/1988 | Lechner et al. |
| 4,785,448 A | 11/1988 | Reichert et al. |
| 4,787,082 A | 11/1988 | Delaney et al. |
| 4,788,527 A | 11/1988 | Johansson |
| 4,799,211 A | 1/1989 | Felker et al. |
| 4,803,719 A | 2/1989 | Ulrich |
| 4,806,905 A | 2/1989 | McGowan, III et al. |
| 4,807,225 A | 2/1989 | Fitch |
| 4,809,296 A | 2/1989 | Braun et al. |
| 4,809,339 A | 2/1989 | Shih et al. |
| 4,813,066 A | 3/1989 | Holtz et al. |
| 4,814,941 A | 3/1989 | Speet et al. |
| 4,815,106 A | 3/1989 | Propp et al. |
| 4,821,319 A | 4/1989 | Middleton et al. |
| 4,825,349 A | 4/1989 | Marcel |
| 4,852,151 A | 7/1989 | Dittakavi et al. |
| 4,866,602 A | 9/1989 | Hall |
| 4,866,757 A | 9/1989 | Nilssen |
| 4,872,197 A | 10/1989 | Pemmaraju |
| 4,890,102 A | 12/1989 | Oliver |
| 4,896,349 A | 1/1990 | Kubo et al. |
| 4,899,131 A | 2/1990 | Wilk et al. |
| 4,901,218 A | 2/1990 | Cornwell |
| 4,903,292 A | 2/1990 | Dillon |
| 4,914,688 A | 4/1990 | Kobayashi et al. |
| 4,918,688 A | 4/1990 | Krause et al. |
| 4,922,503 A | 5/1990 | Leone |
| 4,924,349 A | 5/1990 | Buehler et al. |
| 4,924,492 A | 5/1990 | Gitlin et al. |
| 4,926,158 A | 5/1990 | Zeigler |
| 4,939,728 A | 7/1990 | Markkula, Jr. et al. |
| 4,947,484 A | 8/1990 | Twitty et al. |
| 4,953,055 A | 8/1990 | Douhet et al. |
| 4,955,018 A | 9/1990 | Twitty et al. |
| 4,969,147 A | 11/1990 | Markkula, Jr. et al. |
| 4,973,954 A | 11/1990 | Schwarz |
| 4,975,903 A | 12/1990 | Wakerly et al. |
| 4,979,183 A | 12/1990 | Cowart |
| 4,991,221 A | 2/1991 | Rush |
| 4,992,774 A | 2/1991 | McCullough |
| 5,001,774 A | 3/1991 | Lee |
| 5,003,457 A | 3/1991 | Ikei et al. |
| 5,010,399 A | 4/1991 | Goodman et al. |
| 5,014,308 A | 5/1991 | Fox |
| 5,018,138 A | 5/1991 | Twitty et al. |
| 5,021,779 A | 6/1991 | Bisak |
| 5,025,443 A | 6/1991 | Gupta |
| 5,032,819 A | 7/1991 | Sakuragi et al. |
| 5,033,062 A | 7/1991 | Morrow et al. |
| 5,033,112 A | 7/1991 | Bowling et al. |
| 5,034,531 A | 7/1991 | Friary et al. |
| 5,034,882 A | 7/1991 | Eisenhard et al. |
| 5,034,883 A | 7/1991 | Donaldson et al. |
| 5,034,948 A | 7/1991 | Mizutani et al. |
| 5,063,563 A | 11/1991 | Ikeda et al. |
| 5,065,133 A | 11/1991 | Howard |
| 5,068,890 A | 11/1991 | Nilssen |
| 5,089,927 A | 2/1992 | Bulan et al. |
| 5,089,974 A | 2/1992 | Demeyer et al. |
| 5,111,497 A | 5/1992 | Bliven et al. |
| 5,113,498 A | 5/1992 | Evan et al. |

(56) References Cited

U.S. PATENT DOCUMENTS

| | | |
|---|---|---|
| 5,114,365 A | 5/1992 | Thompson et al. |
| 5,121,482 A | 6/1992 | Patton |
| 5,125,026 A | 6/1992 | Holcombe |
| 5,125,077 A | 6/1992 | Hall |
| 5,136,580 A | 8/1992 | Videlock et al. |
| 5,144,544 A | 9/1992 | Jenneve et al. |
| 5,146,471 A | 9/1992 | Cowart et al. |
| 5,148,144 A | 9/1992 | Sutterlin et al. |
| 5,150,365 A | 9/1992 | Hirata et al. |
| 5,157,711 A | 10/1992 | Shimanuki |
| 5,175,764 A | 12/1992 | Patel et al. |
| 5,179,586 A | 1/1993 | Lee |
| 5,181,240 A | 1/1993 | Sakuragi et al. |
| 5,192,231 A | 3/1993 | Dolin, Jr. |
| 5,210,518 A | 5/1993 | Graham et al. |
| 5,210,519 A | 5/1993 | Moore |
| 5,210,788 A | 5/1993 | Nilssen |
| 5,216,704 A | 6/1993 | Williams et al. |
| 5,220,561 A | 6/1993 | Nuhn et al. |
| 5,220,597 A | 6/1993 | Horiuchi |
| 5,224,154 A | 6/1993 | Aldridge et al. |
| 5,241,283 A | 8/1993 | Sutterlin |
| 5,247,347 A | 9/1993 | Litteral et al. |
| 5,255,267 A | 10/1993 | Hansen et al. |
| 5,257,006 A | 10/1993 | Graham et al. |
| 5,265,154 A | 11/1993 | Schotz |
| 5,268,676 A | 12/1993 | Asprey et al. |
| 5,274,631 A | 12/1993 | Bhardwaj |
| 5,283,825 A | 2/1994 | Druckman et al. |
| 5,285,477 A | 2/1994 | Leonowich |
| 5,289,359 A | 2/1994 | Ziermann |
| 5,289,461 A | 2/1994 | De Nijs |
| 5,289,476 A | 2/1994 | Johnson et al. |
| 5,297,141 A | 3/1994 | Marum |
| 5,311,114 A | 5/1994 | Sambamurthy et al. |
| 5,311,518 A | 5/1994 | Takato et al. |
| 5,311,593 A | 5/1994 | Carmi |
| 5,319,571 A | 6/1994 | Langer et al. |
| 5,323,461 A | 6/1994 | Rosenbaum et al. |
| 5,341,370 A | 8/1994 | Nuhn et al. |
| 5,341,415 A | 8/1994 | Baran |
| 5,343,240 A | 8/1994 | Yu |
| 5,343,514 A | 8/1994 | Snyder |
| 5,345,437 A | 9/1994 | Ogawa |
| 5,347,549 A | 9/1994 | Baumann et al. |
| 5,351,272 A | 9/1994 | Abraham |
| 5,353,409 A | 10/1994 | Asprey et al. |
| 5,355,114 A | 10/1994 | Sutterlin et al. |
| 5,356,311 A | 10/1994 | Liu |
| 5,368,041 A | 11/1994 | Shambroom |
| 5,375,051 A | 12/1994 | Decker et al. |
| 5,381,462 A | 1/1995 | Larson et al. |
| 5,381,804 A | 1/1995 | Shambroom |
| 5,391,932 A | 2/1995 | Small et al. |
| 5,396,636 A | 3/1995 | Gallagher et al. |
| 5,400,068 A | 3/1995 | Ishida et al. |
| 5,402,902 A | 4/1995 | Bouley |
| 5,404,127 A | 4/1995 | Lee et al. |
| 5,406,249 A | 4/1995 | Pettus |
| 5,406,260 A | 4/1995 | Cummings et al. |
| 5,410,535 A | 4/1995 | Yang et al. |
| 5,414,708 A | 5/1995 | Webber et al. |
| 5,420,572 A | 5/1995 | Dolin, Jr. et al. |
| 5,420,578 A | 5/1995 | O'Brien et al. |
| 5,420,886 A | 5/1995 | Ohmori |
| 5,421,030 A | 5/1995 | Baran |
| 5,422,519 A | 6/1995 | Russell |
| 5,422,929 A | 6/1995 | Hurst et al. |
| 5,424,710 A | 6/1995 | Baumann |
| 5,425,089 A | 6/1995 | Chan et al. |
| 5,428,608 A | 6/1995 | Freeman et al. |
| 5,428,682 A | 6/1995 | Apfel |
| 5,438,678 A | 8/1995 | Smith |
| 5,440,335 A | 8/1995 | Beveridge |
| 5,446,905 A | 8/1995 | Koshiishi |
| 5,450,393 A | 9/1995 | Watanabe et al. |
| 5,451,923 A | 9/1995 | Seberger et al. |
| 5,454,008 A | 9/1995 | Baumann et al. |
| 5,457,629 A | 10/1995 | Miller et al. |
| 5,461,671 A | 10/1995 | Sakuragi et al. |
| 5,467,384 A | 11/1995 | Skinner, Sr. et al. |
| 5,469,150 A | 11/1995 | Sitte |
| 5,471,190 A | 11/1995 | Zimmermann |
| 5,473,517 A | 12/1995 | Blackman |
| 5,475,687 A | 12/1995 | Markkula, Jr. et al. |
| 5,477,091 A | 12/1995 | Fiorina et al. |
| 5,479,421 A | 12/1995 | Takebe |
| 5,479,447 A | 12/1995 | Chow et al. |
| 5,483,230 A | 1/1996 | Mueller |
| 5,483,574 A | 1/1996 | Yuyama |
| 5,483,656 A | 1/1996 | Oprescu et al. |
| 5,487,066 A | 1/1996 | McNamara et al. |
| 5,491,402 A | 2/1996 | Small |
| 5,491,463 A | 2/1996 | Sargeant et al. |
| 5,499,241 A | 3/1996 | Thompson et al. |
| 5,500,794 A | 3/1996 | Fujita et al. |
| 5,504,454 A | 4/1996 | Daggett et al. |
| 5,513,251 A | 4/1996 | Rochkind et al. |
| 5,517,172 A | 5/1996 | Chiu |
| 5,519,731 A | 5/1996 | Cioffi |
| 5,525,962 A | 6/1996 | Tice |
| 5,528,089 A | 6/1996 | Guiset et al. |
| 5,528,507 A | 6/1996 | McNamara et al. |
| 5,530,748 A | 6/1996 | Ohmori |
| 5,534,912 A | 7/1996 | Kostreski |
| 5,535,336 A | 7/1996 | Smith et al. |
| 5,539,805 A | 7/1996 | Bushue et al. |
| 5,539,821 A | 7/1996 | Blonder |
| 5,544,164 A | 8/1996 | Baran |
| 5,544,243 A | 8/1996 | Papadopoulos |
| 5,546,385 A | 8/1996 | Caspi et al. |
| 5,548,614 A | 8/1996 | Stoll et al. |
| 5,550,900 A | 8/1996 | Ensor et al. |
| 5,553,138 A | 9/1996 | Heald et al. |
| 5,557,612 A | 9/1996 | Bingham |
| 5,562,493 A | 10/1996 | Ferrill et al. |
| 5,563,515 A | 10/1996 | Kako |
| 5,563,782 A | 10/1996 | Chen et al. |
| 5,568,547 A | 10/1996 | Nishimura |
| 5,569,209 A | 10/1996 | Roitman |
| 5,570,085 A | 10/1996 | Bertsch |
| 5,572,182 A | 11/1996 | De Pinho Filho et al. |
| 5,574,256 A | 11/1996 | Cottone |
| 5,574,748 A | 11/1996 | Vander Mey et al. |
| 5,579,221 A | 11/1996 | Mun |
| 5,579,486 A * | 11/1996 | Oprescu et al. ............... 710/107 |
| 5,581,801 A | 12/1996 | Spriester et al. |
| 5,583,934 A | 12/1996 | Zhou |
| 5,590,124 A | 12/1996 | Robins |
| 5,594,726 A | 1/1997 | Thompson et al. |
| 5,594,732 A | 1/1997 | Bell et al. |
| 5,594,789 A | 1/1997 | Seazholtz et al. |
| 5,599,190 A | 2/1997 | Willette |
| 5,608,447 A | 3/1997 | Farry et al. |
| 5,608,725 A | 3/1997 | Grube et al. |
| 5,608,792 A | 3/1997 | Laidler |
| 5,610,552 A | 3/1997 | Schlesinger et al. |
| 5,610,922 A | 3/1997 | Balatoni |
| 5,613,130 A | 3/1997 | Teng et al. |
| 5,613,190 A | 3/1997 | Hylton |
| 5,613,191 A | 3/1997 | Hylton et al. |
| 5,619,505 A | 4/1997 | Grube et al. |
| 5,623,537 A | 4/1997 | Ensor et al. |
| 5,625,651 A | 4/1997 | Cioffi |
| 5,625,677 A | 4/1997 | Feiertag et al. |
| 5,625,863 A | 4/1997 | Abraham |
| 5,627,501 A | 5/1997 | Biran et al. |
| 5,635,896 A | 6/1997 | Tinsley et al. |
| 5,638,512 A | 6/1997 | Osman et al. |
| 5,644,286 A | 7/1997 | Brosh et al. |
| 5,651,696 A | 7/1997 | Jennison |
| 5,652,893 A | 7/1997 | Ben-Meir et al. |
| 5,659,608 A | 8/1997 | Stiefel |
| 5,668,814 A | 9/1997 | Balatoni |

(56) References Cited

U.S. PATENT DOCUMENTS

| | | | |
|---|---|---|---|
| 5,668,857 A | 9/1997 | McHale |
| 5,671,220 A | 9/1997 | Tonomura |
| 5,673,290 A | 9/1997 | Cioffi |
| 5,675,813 A | 10/1997 | Holmdahl |
| 5,680,397 A | 10/1997 | Christensen et al. |
| 5,682,423 A | 10/1997 | Walker |
| 5,684,826 A | 11/1997 | Ratner |
| 5,689,230 A | 11/1997 | Merwin et al. |
| 5,696,790 A | 12/1997 | Graham et al. |
| 5,699,413 A | 12/1997 | Sridhar |
| 5,706,007 A | 1/1998 | Fragnito et al. |
| 5,706,157 A | 1/1998 | Galecki et al. |
| 5,706,278 A * | 1/1998 | Robillard et al. ............. 370/222 |
| 5,708,701 A | 1/1998 | Houvig et al. |
| 5,708,705 A | 1/1998 | Yamashita et al. |
| 5,712,614 A | 1/1998 | Patel et al. |
| 5,712,977 A | 1/1998 | Glad et al. |
| 5,727,025 A | 3/1998 | Maryanka |
| 5,736,965 A | 4/1998 | Mosebrook et al. |
| 5,742,527 A | 4/1998 | Rybicki et al. |
| 5,748,634 A | 5/1998 | Sokol et al. |
| 5,751,701 A | 5/1998 | Langberg et al. |
| 5,754,539 A | 5/1998 | Metz et al. |
| 5,756,280 A | 5/1998 | Soora et al. |
| 5,768,279 A | 6/1998 | Barn et al. |
| 5,771,236 A | 6/1998 | Sansom et al. |
| 5,774,789 A | 6/1998 | Van der Kaay et al. |
| 5,777,769 A | 7/1998 | Coutinho |
| 5,778,303 A | 7/1998 | Shinozaki et al. |
| 5,781,617 A | 7/1998 | McHale et al. |
| 5,781,844 A | 7/1998 | Spriester et al. |
| 5,790,548 A | 8/1998 | Sistanizadeh et al. |
| 5,793,413 A | 8/1998 | Hylton et al. |
| 5,796,739 A | 8/1998 | Kim et al. |
| 5,796,965 A | 8/1998 | Choi et al. |
| 5,799,069 A | 8/1998 | Weston et al. |
| 5,799,196 A | 8/1998 | Flannery |
| 5,801,635 A | 9/1998 | Price |
| 5,802,173 A | 9/1998 | Hamilton-Piercy et al. |
| 5,805,053 A | 9/1998 | Patel et al. |
| 5,805,591 A | 9/1998 | Naboulsi et al. |
| 5,805,597 A | 9/1998 | Edem |
| 5,805,806 A | 9/1998 | McArthur |
| 5,809,033 A | 9/1998 | Turner et al. |
| 5,815,681 A | 9/1998 | Kikinis |
| 5,818,710 A | 10/1998 | Levan Suu |
| 5,818,725 A | 10/1998 | McNamara et al. |
| 5,818,821 A | 10/1998 | Schurig |
| 5,822,374 A | 10/1998 | Levin |
| 5,822,677 A | 10/1998 | Peyrovian |
| 5,822,678 A | 10/1998 | Evanyk |
| 5,828,293 A | 10/1998 | Rickard |
| 5,828,558 A | 10/1998 | Korcharz et al. |
| 5,828,821 A | 10/1998 | Hoshina et al. |
| 5,832,057 A | 11/1998 | Furman |
| 5,833,350 A | 11/1998 | Moreland |
| 5,835,005 A | 11/1998 | Furukawa et al. |
| 5,838,989 A | 11/1998 | Hutchison et al. |
| 5,841,841 A | 11/1998 | Dodds et al. |
| 5,842,032 A | 11/1998 | Bertsch |
| 5,844,596 A | 12/1998 | Goodman |
| 5,844,888 A | 12/1998 | Markkula, Jr. et al. |
| 5,845,190 A | 12/1998 | Bushue et al. |
| 5,845,201 A | 12/1998 | Funke et al. |
| 5,848,054 A | 12/1998 | Mosebrook et al. |
| 5,848,376 A | 12/1998 | Steiner et al. |
| 5,859,584 A | 1/1999 | Counsell |
| 5,859,596 A | 1/1999 | McRae |
| 5,878,047 A | 3/1999 | Ganek et al. |
| 5,878,133 A | 3/1999 | Zhou et al. |
| 5,884,086 A | 3/1999 | Amoni et al. |
| 5,886,732 A | 3/1999 | Humpleman |
| 5,889,856 A | 3/1999 | O'Toole et al. |
| 5,892,792 A | 4/1999 | Walley |
| 5,892,795 A | 4/1999 | Paret |
| 5,895,985 A | 4/1999 | Fischer |
| 5,896,443 A | 4/1999 | Dichter |
| 5,896,556 A | 4/1999 | Moreland et al. |
| 5,898,761 A | 4/1999 | McHale et al. |
| 5,903,213 A | 5/1999 | Hodge et al. |
| 5,905,781 A | 5/1999 | McHale et al. |
| 5,905,786 A | 5/1999 | Hoopes |
| 5,909,559 A | 6/1999 | So |
| 5,910,970 A | 6/1999 | Lu |
| 5,912,895 A | 6/1999 | Terry et al. |
| 5,917,624 A | 6/1999 | Wagner |
| 5,917,814 A | 6/1999 | Balatoni |
| 5,929,896 A | 7/1999 | Goodman et al. |
| 5,930,340 A | 7/1999 | Bell |
| 5,936,963 A | 8/1999 | Saussy |
| 5,938,757 A | 8/1999 | Bertsch |
| 5,939,801 A | 8/1999 | Bouffard et al. |
| 5,940,400 A | 8/1999 | Eastmond et al. |
| 5,940,738 A | 8/1999 | Rao |
| 5,944,831 A | 8/1999 | Pate et al. |
| 5,949,473 A | 9/1999 | Goodman |
| 5,956,323 A | 9/1999 | Bowie |
| 5,960,066 A | 9/1999 | Hartmann et al. |
| 5,960,208 A | 9/1999 | Obata et al. |
| 5,963,539 A | 10/1999 | Webber, Jr. et al. |
| 5,963,595 A | 10/1999 | Graham et al. |
| 5,963,844 A | 10/1999 | Dail |
| 5,968,118 A | 10/1999 | Sutton, Jr. |
| 5,973,942 A | 10/1999 | Nelson et al. |
| 5,974,553 A | 10/1999 | Gandar |
| 5,978,373 A | 11/1999 | Hoff et al. |
| 5,982,052 A | 11/1999 | Sosnowski |
| 5,987,061 A | 11/1999 | Chen |
| 5,990,577 A | 11/1999 | Kamioka et al. |
| 5,991,311 A | 11/1999 | Long et al. |
| 5,991,831 A | 11/1999 | Lee et al. |
| 5,991,885 A | 11/1999 | Chang et al. |
| 5,994,998 A | 11/1999 | Fisher et al. |
| 5,999,518 A | 12/1999 | Nattkemper et al. |
| 5,999,612 A | 12/1999 | Dunn et al. |
| 6,002,682 A | 12/1999 | Bellenger et al. |
| 6,009,465 A | 12/1999 | Decker et al. |
| 6,009,479 A | 12/1999 | Jeffries |
| 6,010,228 A | 1/2000 | Blackman et al. |
| 6,011,781 A | 1/2000 | Bell |
| 6,011,794 A | 1/2000 | Mordowitz et al. |
| 6,011,910 A | 1/2000 | Chau et al. |
| 6,014,386 A | 1/2000 | Abraham |
| 6,014,431 A | 1/2000 | McHale et al. |
| 6,016,519 A | 1/2000 | Chida et al. |
| 6,021,158 A | 2/2000 | Schurr et al. |
| 6,025,945 A | 2/2000 | Nyu et al. |
| 6,026,078 A | 2/2000 | Smith |
| 6,026,160 A | 2/2000 | Staber et al. |
| 6,028,867 A | 2/2000 | Rawson et al. |
| 6,033,101 A | 3/2000 | Reddick et al. |
| 6,038,300 A | 3/2000 | Hartmann et al. |
| 6,038,425 A | 3/2000 | Jeffrey |
| 6,038,457 A | 3/2000 | Barkat |
| 6,049,471 A | 4/2000 | Korcharz et al. |
| 6,049,531 A | 4/2000 | Roy |
| 6,049,881 A | 4/2000 | Massman et al. |
| 6,055,268 A | 4/2000 | Timm et al. |
| 6,055,633 A | 4/2000 | Schrier et al. |
| 6,061,261 A | 5/2000 | Chen et al. |
| 6,064,422 A | 5/2000 | Goolcharan et al. |
| 6,064,673 A | 5/2000 | Anderson et al. |
| 6,069,588 A | 5/2000 | O'Neill, Jr. |
| 6,069,879 A | 5/2000 | Chatter |
| 6,069,890 A | 5/2000 | White et al. |
| 6,069,899 A | 5/2000 | Foley |
| 6,072,779 A | 6/2000 | Tzannes et al. |
| 6,072,810 A | 6/2000 | Van Der Putten et al. |
| 6,075,784 A | 6/2000 | Frankel et al. |
| 6,081,519 A | 6/2000 | Petler |
| 6,081,533 A | 6/2000 | Laubach et al. |
| 6,087,835 A | 7/2000 | Haneda |
| 6,087,860 A | 7/2000 | Liu et al. |
| 6,095,867 A | 8/2000 | Brandt et al. |

(56) References Cited

U.S. PATENT DOCUMENTS

| | | | |
|---|---|---|---|
| 6,097,761 A | 8/2000 | Buhring et al. | |
| 6,101,499 A | 8/2000 | Ford et al. | |
| 6,107,912 A | 8/2000 | Bullock et al. | |
| 6,108,330 A | 8/2000 | Bhatia et al. | |
| 6,108,331 A | 8/2000 | Thompson | |
| 6,109,959 A | 8/2000 | Burlinson et al. | |
| 6,111,595 A | 8/2000 | Hertrich | |
| 6,111,764 A | 8/2000 | Atou et al. | |
| 6,111,936 A | 8/2000 | Bremer | |
| 6,112,232 A | 8/2000 | Shahar et al. | |
| 6,114,632 A | 9/2000 | Planas, Sr. et al. | |
| 6,114,970 A | 9/2000 | Kirson et al. | |
| 6,115,468 A * | 9/2000 | De Nicolo | 379/413 |
| 6,115,755 A | 9/2000 | Krishan | |
| 6,115,822 A | 9/2000 | Kim et al. | |
| 6,123,577 A | 9/2000 | Contois et al. | |
| 6,125,448 A | 9/2000 | Schwan et al. | |
| 6,126,463 A | 10/2000 | Okazaki et al. | |
| 6,128,743 A | 10/2000 | Rothenbaum | |
| 6,130,879 A | 10/2000 | Liu | |
| 6,130,896 A | 10/2000 | Lueker et al. | |
| 6,137,865 A | 10/2000 | Ripy et al. | |
| 6,137,866 A | 10/2000 | Staber et al. | |
| 6,141,330 A | 10/2000 | Akers | |
| 6,141,339 A | 10/2000 | Kaplan et al. | |
| 6,141,763 A | 10/2000 | Smith et al. | |
| 6,144,292 A | 11/2000 | Brown | |
| 6,148,006 A | 11/2000 | Dyke et al. | |
| 6,151,480 A | 11/2000 | Fischer et al. | |
| 6,157,645 A | 12/2000 | Shobatake | |
| 6,157,716 A | 12/2000 | Ortel | |
| 6,166,496 A | 12/2000 | Lys et al. | |
| 6,167,043 A | 12/2000 | Frantz | |
| 6,167,120 A | 12/2000 | Kikinis | |
| 6,175,556 B1 | 1/2001 | Allen, Jr. et al. | |
| 6,175,860 B1 | 1/2001 | Gaucher | |
| 6,178,161 B1 | 1/2001 | Terry | |
| 6,178,455 B1 | 1/2001 | Schutte et al. | |
| 6,178,514 B1 | 1/2001 | Wood | |
| 6,181,775 B1 | 1/2001 | Bella | |
| 6,181,783 B1 | 1/2001 | Goodman | |
| 6,185,284 B1 | 2/2001 | Goodman | |
| 6,186,826 B1 | 2/2001 | Weikle | |
| 6,188,314 B1 | 2/2001 | Wallace et al. | |
| 6,188,557 B1 | 2/2001 | Chaudhry | |
| 6,192,399 B1 | 2/2001 | Goodman | |
| 6,195,339 B1 | 2/2001 | Erite et al. | |
| 6,195,706 B1 | 2/2001 | Scott | |
| 6,205,202 B1 | 3/2001 | Yoshida et al. | |
| 6,205,495 B1 | 3/2001 | Gilbert et al. | |
| 6,207,895 B1 | 3/2001 | Engel | |
| 6,208,637 B1 | 3/2001 | Eames | |
| 6,208,859 B1 | 3/2001 | Halvorson | |
| 6,212,204 B1 | 4/2001 | Depue | |
| 6,212,274 B1 | 4/2001 | Ninh | |
| 6,215,789 B1 | 4/2001 | Keenan et al. | |
| 6,215,855 B1 | 4/2001 | Schneider | |
| 6,216,160 B1 | 4/2001 | Dichter | |
| 6,218,930 B1 | 4/2001 | Katzenberg et al. | |
| 6,219,409 B1 | 4/2001 | Smith et al. | |
| 6,222,124 B1 | 4/2001 | Pritchard et al. | |
| 6,222,853 B1 | 4/2001 | Marttinen et al. | |
| 6,227,499 B1 | 5/2001 | Jennison et al. | |
| 6,229,818 B1 | 5/2001 | Bell | |
| 6,236,653 B1 | 5/2001 | Dalton et al. | |
| 6,236,664 B1 | 5/2001 | Erreygers | |
| 6,236,718 B1 | 5/2001 | Goodman | |
| 6,239,672 B1 | 5/2001 | Lutz, Jr. et al. | |
| 6,240,091 B1 | 5/2001 | Ginzboorg et al. | |
| 6,240,166 B1 | 5/2001 | Collin et al. | |
| 6,243,394 B1 | 6/2001 | Deng | |
| 6,243,413 B1 | 6/2001 | Beukema | |
| 6,243,446 B1 | 6/2001 | Goodman | |
| 6,243,571 B1 | 6/2001 | Bullock et al. | |
| 6,243,818 B1 | 6/2001 | Schwan et al. | |
| 6,246,695 B1 | 6/2001 | Seazholtz et al. | |
| 6,246,716 B1 | 6/2001 | Schneider | |
| 6,246,748 B1 | 6/2001 | Yano | |
| 6,252,754 B1 | 6/2001 | Chaudhry | |
| 6,252,755 B1 | 6/2001 | Willer | |
| 6,252,957 B1 | 6/2001 | Jauregui et al. | |
| 6,256,518 B1 | 7/2001 | Buhrmann | |
| 6,259,676 B1 | 7/2001 | Kellock et al. | |
| 6,266,348 B1 | 7/2001 | Gross et al. | |
| 6,272,219 B1 | 8/2001 | De Bruycker et al. | |
| 6,278,769 B1 | 8/2001 | Bella | |
| 6,282,075 B1 | 8/2001 | Chaudhry | |
| 6,282,189 B1 | 8/2001 | Eames | |
| 6,283,789 B1 | 9/2001 | Tsai | |
| 6,286,049 B1 | 9/2001 | Rajakarunanayake et al. | |
| 6,288,334 B1 | 9/2001 | Hennum | |
| 6,292,517 B1 | 9/2001 | Jeffress et al. | |
| 6,295,356 B1 | 9/2001 | De Nicolo | |
| 6,297,450 B1 | 10/2001 | Yu | |
| 6,298,037 B1 | 10/2001 | Sharifi | |
| 6,301,337 B1 | 10/2001 | Scholtz et al. | |
| 6,301,527 B1 | 10/2001 | Butland et al. | |
| 6,308,215 B1 | 10/2001 | Kolbet et al. | |
| 6,308,240 B1 | 10/2001 | De Nicolo | |
| 6,310,286 B1 | 10/2001 | Troxel et al. | |
| 6,310,781 B1 | 10/2001 | Karam | |
| 6,310,909 B1 | 10/2001 | Jones | |
| 6,314,102 B1 | 11/2001 | Czerwiec et al. | |
| 6,317,839 B1 | 11/2001 | Wells | |
| 6,317,884 B1 | 11/2001 | Eames | |
| 6,320,494 B1 | 11/2001 | Bartels et al. | |
| 6,320,866 B2 | 11/2001 | Wolf et al. | |
| 6,320,900 B1 | 11/2001 | Liu | |
| 6,329,937 B1 | 12/2001 | Harman | |
| 6,343,331 B1 | 1/2002 | Stirling | |
| 6,346,964 B1 | 2/2002 | Rogers et al. | |
| 6,348,874 B1 | 2/2002 | Cole et al. | |
| 6,349,133 B1 | 2/2002 | Matthews et al. | |
| 6,353,629 B1 | 3/2002 | Pal | |
| 6,357,011 B2 | 3/2002 | Gilbert | |
| 6,359,906 B1 | 3/2002 | Dyke et al. | |
| 6,362,610 B1 | 3/2002 | Yang | |
| 6,362,987 B1 | 3/2002 | Yurek et al. | |
| 6,363,066 B1 | 3/2002 | Frimodig | |
| 6,364,535 B1 | 4/2002 | Coffey | |
| 6,366,143 B1 | 4/2002 | Liu et al. | |
| 6,377,874 B1 | 4/2002 | Ykema | |
| 6,380,852 B1 | 4/2002 | Hartman | |
| 6,383,076 B1 | 5/2002 | Tiedeken | |
| 6,385,024 B1 | 5/2002 | Olson | |
| 6,385,203 B2 | 5/2002 | McHale et al. | |
| 6,388,990 B1 | 5/2002 | Wetzel | |
| 6,389,110 B1 | 5/2002 | Fischer et al. | |
| 6,389,139 B1 | 5/2002 | Curtis et al. | |
| 6,393,050 B1 | 5/2002 | Liu | |
| 6,393,607 B1 | 5/2002 | Hughes et al. | |
| 6,396,391 B1 | 5/2002 | Binder | |
| 6,396,837 B1 | 5/2002 | Wang et al. | |
| 6,404,861 B1 | 6/2002 | Cohen et al. | |
| 6,408,351 B1 | 6/2002 | Hamdi et al. | |
| 6,411,656 B1 | 6/2002 | Bors | |
| 6,414,952 B2 | 7/2002 | Foley | |
| 6,418,558 B1 | 7/2002 | Roberts et al. | |
| 6,420,964 B1 | 7/2002 | Nishikawa et al. | |
| 6,430,199 B1 | 8/2002 | Kerpez | |
| 6,433,672 B1 | 8/2002 | Shirmard | |
| 6,438,109 B1 | 8/2002 | Karaoguz et al. | |
| 6,441,723 B1 | 8/2002 | Mansfield, Jr. et al. | |
| 6,442,195 B1 | 8/2002 | Liu et al. | |
| 6,445,087 B1 | 9/2002 | Wang et al. | |
| 6,448,899 B1 | 9/2002 | Thompson | |
| 6,449,318 B1 | 9/2002 | Rumbaugh | |
| 6,449,348 B1 | 9/2002 | Lamb et al. | |
| 6,452,923 B1 | 9/2002 | Gerszberg et al. | |
| 6,456,714 B2 | 9/2002 | Shima et al. | |
| 6,459,175 B1 | 10/2002 | Potega | |
| 6,459,275 B1 | 10/2002 | Ewalt et al. | |
| 6,463,051 B1 | 10/2002 | Ford | |
| 6,470,053 B1 | 10/2002 | Liu | |

(56) References Cited

U.S. PATENT DOCUMENTS

| | | |
|---|---|---|
| 6,470,401 B1 | 10/2002 | Peterson |
| 6,473,608 B1 | 10/2002 | Lehr et al. |
| 6,474,829 B2 | 11/2002 | Clodfelter |
| 6,475,022 B2 | 11/2002 | Tomino et al. |
| 6,477,457 B1 | 11/2002 | Fendt et al. |
| 6,477,595 B1 | 11/2002 | Cohen et al. |
| 6,480,122 B1 | 11/2002 | Oddy et al. |
| 6,481,013 B1 | 11/2002 | Dinwiddie et al. |
| 6,483,902 B1 | 11/2002 | Stewart et al. |
| 6,483,903 B1 | 11/2002 | Itay |
| 6,490,273 B1 | 12/2002 | DeNap et al. |
| 6,492,897 B1 | 12/2002 | Mowery, Jr. |
| 6,493,875 B1 | 12/2002 | Eames et al. |
| 6,496,103 B1 | 12/2002 | Weiss et al. |
| 6,501,389 B1 | 12/2002 | Aguirre |
| 6,507,322 B2 | 1/2003 | Fang et al. |
| 6,510,204 B2 | 1/2003 | De Clercq et al. |
| 6,518,724 B2 | 2/2003 | Janik |
| 6,519,291 B1 | 2/2003 | Dagdeviren |
| 6,522,352 B1 | 2/2003 | Strandwitz et al. |
| 6,522,515 B1 | 2/2003 | Whitney |
| 6,522,662 B1 | 2/2003 | Liu |
| 6,526,516 B1 | 2/2003 | Ishikawa et al. |
| 6,529,443 B2 | 3/2003 | Downey, Jr. et al. |
| 6,535,110 B1 | 3/2003 | Arora et al. |
| 6,535,580 B1 | 3/2003 | Strauss et al. |
| 6,535,587 B1 | 3/2003 | Kobayashi |
| 6,535,983 B1 | 3/2003 | McCormack et al. |
| 6,539,011 B1 | 3/2003 | Keenan et al. |
| 6,539,484 B1 | 3/2003 | Cruz |
| 6,541,878 B1 | 4/2003 | Diab |
| 6,542,465 B1 | 4/2003 | Wang |
| 6,542,585 B2 | 4/2003 | Goodman |
| 6,543,940 B2 | 4/2003 | Chu |
| 6,546,024 B1 | 4/2003 | Sharper et al. |
| 6,546,098 B1 | 4/2003 | Henderson |
| 6,546,494 B1 | 4/2003 | Jackson et al. |
| 6,553,076 B1 | 4/2003 | Huang |
| 6,556,097 B2 | 4/2003 | Coffey |
| 6,556,564 B2 | 4/2003 | Rogers |
| 6,556,581 B1 | 4/2003 | He et al. |
| 6,560,333 B1 | 5/2003 | Consiglio et al. |
| 6,563,418 B1 | 5/2003 | Moon |
| 6,563,816 B1 | 5/2003 | Nodoushani et al. |
| 6,567,522 B1 | 5/2003 | Blackburn |
| 6,567,981 B1 | 5/2003 | Jeffrey |
| 6,570,890 B1 | 5/2003 | Keenan et al. |
| 6,571,181 B1 | 5/2003 | Rakshani et al. |
| 6,571,305 B1 | 5/2003 | Engler |
| 6,572,384 B1 | 6/2003 | Marchevsky |
| 6,574,237 B1 | 6/2003 | Bullman et al. |
| 6,574,242 B1 | 6/2003 | Keenan et al. |
| 6,574,313 B1 | 6/2003 | Chea, Jr. et al. |
| 6,574,741 B1 | 6/2003 | Fujimori et al. |
| 6,577,230 B1 | 6/2003 | Wendt et al. |
| 6,577,631 B1 | 6/2003 | Keenan et al. |
| 6,577,882 B1 | 6/2003 | Roos |
| 6,580,254 B2 | 6/2003 | Schofield |
| 6,580,710 B1 | 6/2003 | Bowen et al. |
| 6,580,727 B1 | 6/2003 | Yim et al. |
| 6,584,122 B1 | 6/2003 | Matthews et al. |
| 6,584,148 B1 | 6/2003 | Zitting et al. |
| 6,584,197 B1 | 6/2003 | Boudreaux, Jr. et al. |
| 6,584,519 B1 | 6/2003 | Russell |
| 6,587,454 B1 | 7/2003 | Lamb |
| 6,587,479 B1 | 7/2003 | Bianchi |
| 6,587,560 B1 | 7/2003 | Scott et al. |
| 6,597,732 B1 | 7/2003 | Dowling |
| 6,601,097 B1 | 7/2003 | Cheston et al. |
| 6,603,220 B2 | 8/2003 | Vergnaud |
| 6,608,264 B1 | 8/2003 | Fouladpour |
| 6,611,537 B1 | 8/2003 | Edens et al. |
| 6,616,005 B1 | 9/2003 | Pereira et al. |
| 6,636,505 B1 | 10/2003 | Wang et al. |
| 6,639,913 B1 | 10/2003 | Frankel et al. |
| 6,640,308 B1 | 10/2003 | Keyghobad et al. |
| 6,643,566 B1 | 11/2003 | Lehr et al. |
| 6,648,308 B2 | 11/2003 | Gunnar Rothoff |
| 6,650,622 B1 | 11/2003 | Austerman, III et al. |
| 6,650,662 B1 | 11/2003 | Arnaud et al. |
| 6,653,932 B1 | 11/2003 | Walley et al. |
| 6,654,353 B1 | 11/2003 | Tokura et al. |
| 6,658,098 B2 | 12/2003 | Lamb et al. |
| 6,658,108 B1 | 12/2003 | Bissell et al. |
| 6,658,109 B1 | 12/2003 | Steinke et al. |
| 6,659,947 B1 | 12/2003 | Carter et al. |
| 6,661,892 B1 | 12/2003 | Fischer |
| 6,665,404 B2 | 12/2003 | Cohen |
| 6,671,360 B2 | 12/2003 | Sumiya et al. |
| 6,674,843 B1 | 1/2004 | Ham |
| 6,674,845 B2 | 1/2004 | Ayoub et al. |
| 6,678,321 B1 | 1/2004 | Graham et al. |
| 6,680,940 B1 | 1/2004 | Lewin et al. |
| 6,681,013 B1 | 1/2004 | Miyamoto |
| 6,690,792 B1 | 2/2004 | Robinson et al. |
| 6,700,970 B1 | 3/2004 | Aronson et al. |
| 6,701,443 B1 | 3/2004 | Bell |
| 6,704,824 B1 | 3/2004 | Goodman |
| 6,710,553 B2 | 3/2004 | Logan |
| 6,710,704 B2 | 3/2004 | Fisher et al. |
| 6,711,260 B1 | 3/2004 | Russell et al. |
| 6,714,534 B1 | 3/2004 | Gerszberg et al. |
| 6,715,087 B1 | 3/2004 | Vergnaud et al. |
| 6,718,552 B1 | 4/2004 | Goode |
| 6,721,790 B1 | 4/2004 | Chen |
| 6,724,750 B1 | 4/2004 | Sun |
| 6,725,059 B1 | 4/2004 | Bell |
| 6,731,627 B1 | 5/2004 | Gupta et al. |
| 6,732,315 B2 | 5/2004 | Yagil et al. |
| 6,735,217 B1 | 5/2004 | Webber, Jr. et al. |
| 6,738,470 B1 | 5/2004 | Aronovitz |
| 6,738,641 B1 | 5/2004 | Elsasser |
| 6,744,883 B1 | 6/2004 | Bingel et al. |
| 6,747,859 B2 | 6/2004 | Walbeck et al. |
| 6,747,995 B1 | 6/2004 | Brown et al. |
| 6,747,996 B2 | 6/2004 | Holloway et al. |
| 6,748,078 B1 | 6/2004 | Posthuma |
| 6,751,682 B1 | 6/2004 | Stirling |
| 6,754,235 B2 | 6/2004 | Van Der Putten et al. |
| 6,755,575 B2 | 6/2004 | Kronlund et al. |
| 6,757,382 B1 | 6/2004 | Wilkes, Jr. et al. |
| 6,760,384 B1 | 7/2004 | Garreau et al. |
| 6,762,675 B1 | 7/2004 | Cafiero et al. |
| 6,763,097 B1 | 7/2004 | Vitenberg |
| 6,763,109 B1 | 7/2004 | Hoskins |
| 6,764,343 B2 | 7/2004 | Ferentz |
| 6,765,149 B1 | 7/2004 | Ku |
| 6,771,774 B1 | 8/2004 | Phan et al. |
| 6,775,299 B1 | 8/2004 | Olson et al. |
| 6,778,549 B1 | 8/2004 | Keller |
| 6,778,646 B1 | 8/2004 | Sun |
| 6,792,323 B2 | 9/2004 | Krzyzanowski et al. |
| 6,795,539 B2 | 9/2004 | Culli et al. |
| 6,800,957 B2 | 10/2004 | Nerone et al. |
| 6,804,351 B1 | 10/2004 | Karam |
| 6,804,828 B1 | 10/2004 | Shibata |
| 6,813,343 B2 | 11/2004 | Vitenberg |
| 6,815,844 B2 | 11/2004 | Kovarik |
| 6,816,512 B2 | 11/2004 | Lazarus et al. |
| 6,819,760 B1 | 11/2004 | Nayler |
| 6,825,672 B1 | 11/2004 | Lo et al. |
| 6,826,174 B1 | 11/2004 | Erekson et al. |
| 6,831,921 B2 | 12/2004 | Higgins |
| 6,831,976 B1 | 12/2004 | Comerford et al. |
| 6,838,997 B1 | 1/2005 | Davidson |
| 6,839,345 B2 | 1/2005 | Lu et al. |
| 6,841,979 B2 | 1/2005 | Berson et al. |
| 6,842,426 B2 | 1/2005 | Bogardus et al. |
| 6,847,718 B1 | 1/2005 | Hiraoka |
| 6,853,724 B2 | 2/2005 | Wang |
| 6,854,895 B2 | 2/2005 | Coffey et al. |
| 6,856,799 B1 | 2/2005 | Ritter |
| 6,862,353 B2 | 3/2005 | Rabenko et al. |
| 6,864,798 B2 | 3/2005 | Janik |

(56) References Cited

U.S. PATENT DOCUMENTS

| | | | |
|---|---|---|---|
| 6,868,072 | B1 | 3/2005 | Lin et al. |
| 6,868,117 | B1 | 3/2005 | Mardinian |
| 6,868,265 | B2 | 3/2005 | Zodnik |
| 6,870,282 | B1 | 3/2005 | Bischoff et al. |
| 6,880,020 | B1 | 4/2005 | Rubinstein et al. |
| 6,886,181 | B1 | 4/2005 | Dodds et al. |
| 6,889,095 | B1 | 5/2005 | Eidson et al. |
| 6,891,881 | B2 | 5/2005 | Trachewsky et al. |
| 6,895,089 | B2 | 5/2005 | Wang |
| 6,898,413 | B2 | 5/2005 | Yip et al. |
| 6,901,439 | B1 | 5/2005 | Bonasia et al. |
| 6,904,149 | B2 | 6/2005 | Keenum et al. |
| 6,906,618 | B2 | 6/2005 | Hair, III et al. |
| 6,907,458 | B2 | 6/2005 | Tomassetti et al. |
| 6,912,145 | B2 | 6/2005 | Hung et al. |
| 6,912,282 | B2 | 6/2005 | Karam |
| 6,917,681 | B2 | 7/2005 | Robinson et al. |
| 6,932,624 | B1 | 8/2005 | Hoopes et al. |
| 6,933,686 | B1 | 8/2005 | Bishel |
| 6,934,300 | B2 | 8/2005 | Tomassetti et al. |
| 6,940,918 | B1 | 9/2005 | Nayler et al. |
| 6,940,956 | B1 | 9/2005 | Leach |
| 6,943,296 | B2 | 9/2005 | Perrella et al. |
| 6,943,683 | B2 | 9/2005 | Perret |
| 6,946,988 | B2 | 9/2005 | Edwards et al. |
| 6,947,287 | B1 | 9/2005 | Zansky et al. |
| 6,952,785 | B1 | 10/2005 | Diab et al. |
| 6,954,863 | B2 | 10/2005 | Mouton |
| 6,955,560 | B1 | 10/2005 | Biggs |
| 6,956,462 | B2 | 10/2005 | Jetzt |
| 6,956,463 | B2 | 10/2005 | Crenella et al. |
| 6,956,826 | B1 | 10/2005 | Binder |
| 6,961,303 | B1 | 11/2005 | Binder |
| 6,963,936 | B2 | 11/2005 | Billington et al. |
| 6,967,952 | B1 | 11/2005 | Akers et al. |
| 6,973,394 | B2 | 12/2005 | Jaeger et al. |
| 6,975,209 | B2 | 12/2005 | Gromov |
| 6,975,713 | B1 | 12/2005 | Smith et al. |
| 6,977,507 | B1 | 12/2005 | Pannell et al. |
| 6,980,638 | B1 | 12/2005 | Smith et al. |
| 6,981,892 | B1 | 1/2006 | Kostelnik |
| 6,985,713 | B2 | 1/2006 | Lehr et al. |
| 6,986,071 | B2 | 1/2006 | Darshan et al. |
| 6,993,289 | B2 | 1/2006 | Janik |
| 6,995,658 | B2 | 2/2006 | Tustison et al. |
| 6,996,134 | B1 | 2/2006 | Renucci et al. |
| 6,996,458 | B2 | 2/2006 | Pincu et al. |
| 6,996,729 | B2 | 2/2006 | Volkening et al. |
| 6,998,964 | B2 | 2/2006 | Lomax, Jr. et al. |
| 6,999,433 | B2 | 2/2006 | Baum |
| 7,003,102 | B2 | 2/2006 | Kiko |
| 7,006,445 | B1 | 2/2006 | Cole et al. |
| 7,010,050 | B2 | 3/2006 | Maryanka |
| 7,012,922 | B1 | 3/2006 | Unitt et al. |
| 7,016,377 | B1 | 3/2006 | Chun et al. |
| 7,023,809 | B1 | 4/2006 | Rubinstein et al. |
| 7,026,730 | B1 | 4/2006 | Marshall et al. |
| 7,027,483 | B2 | 4/2006 | Santhoff et al. |
| 7,030,733 | B2 | 4/2006 | Abbarin |
| 7,031,394 | B2 | 4/2006 | Vitenberg |
| 7,034,225 | B2 | 4/2006 | Thompson et al. |
| 7,035,270 | B2 | 4/2006 | Moore, Jr. et al. |
| 7,035,280 | B2 | 4/2006 | Binder |
| 7,046,983 | B2 | 5/2006 | Elkayam et al. |
| 7,049,514 | B2 | 5/2006 | Brandt et al. |
| 7,050,546 | B1 | 5/2006 | Richardson et al. |
| 7,053,501 | B1 | 5/2006 | Barrass |
| 7,054,442 | B2 | 5/2006 | Weikle |
| 7,058,174 | B2 | 6/2006 | Posthuma |
| 7,061,142 | B1 | 6/2006 | Marshall |
| 7,068,649 | B2 | 6/2006 | Fisher et al. |
| 7,068,682 | B2 | 6/2006 | Campbell et al. |
| 7,068,781 | B2 | 6/2006 | Le Creff et al. |
| 7,072,995 | B1 | 7/2006 | Burroughs |
| 7,079,647 | B2 | 7/2006 | Tomobe |
| 7,081,827 | B2 | 7/2006 | Addy |
| 7,085,238 | B2 | 8/2006 | McBeath |
| 7,088,238 | B2 | 8/2006 | Karaoguz et al. |
| 7,089,126 | B2 | 8/2006 | Muir |
| 7,095,848 | B1 | 8/2006 | Fischer et al. |
| 7,099,707 | B2 | 8/2006 | Amin et al. |
| 7,113,574 | B1 | 9/2006 | Haas et al. |
| 7,116,685 | B2 | 10/2006 | Brown et al. |
| 7,117,272 | B2 | 10/2006 | Rimboim et al. |
| 7,133,423 | B1 | 11/2006 | Chow et al. |
| 7,143,299 | B1 | 11/2006 | Rubinstein et al. |
| 7,145,439 | B2 | 12/2006 | Darshan et al. |
| 7,145,996 | B2 | 12/2006 | Creamer et al. |
| 7,149,182 | B1 | 12/2006 | Renucci et al. |
| 7,152,168 | B2 | 12/2006 | Boynton et al. |
| 7,154,381 | B2 | 12/2006 | Lang et al. |
| 7,155,214 | B2 | 12/2006 | Struthers et al. |
| 7,155,622 | B2 | 12/2006 | Mancey et al. |
| 7,162,234 | B1 | 1/2007 | Smith |
| 7,162,377 | B2 | 1/2007 | Amrod et al. |
| 7,162,650 | B2 | 1/2007 | Ke et al. |
| 7,167,923 | B2 | 1/2007 | Lo |
| 7,170,194 | B2 | 1/2007 | Korcharz et al. |
| 7,170,405 | B2 | 1/2007 | Daum et al. |
| 7,181,023 | B1 | 2/2007 | Andrews et al. |
| 7,187,695 | B2 | 3/2007 | Binder |
| 7,190,716 | B2 | 3/2007 | Norrell et al. |
| 7,193,149 | B2 | 3/2007 | Polanek et al. |
| 7,194,639 | B2 | 3/2007 | Atkinson et al. |
| 7,200,152 | B2 * | 4/2007 | Binder ........................ 370/463 |
| 7,203,849 | B2 | 4/2007 | Dove |
| 7,203,851 | B1 | 4/2007 | Lo et al. |
| 7,207,846 | B2 | 4/2007 | Caveney et al. |
| 7,209,945 | B2 | 4/2007 | Hicks, III et al. |
| 7,215,763 | B1 | 5/2007 | Keller et al. |
| 7,221,261 | B1 | 5/2007 | Klingensmith et al. |
| 7,225,345 | B2 | 5/2007 | Korcharz et al. |
| 7,231,535 | B2 | 6/2007 | Le Creff et al. |
| 7,239,627 | B2 | 7/2007 | Nattkemper et al. |
| 7,239,628 | B1 | 7/2007 | Pendleton et al. |
| 7,240,224 | B1 | 7/2007 | Biederman |
| 7,254,734 | B2 | 8/2007 | Lehr et al. |
| 7,256,684 | B1 | 8/2007 | Cafiero et al. |
| 7,256,704 | B2 | 8/2007 | Yoon et al. |
| 7,257,106 | B2 | 8/2007 | Chen et al. |
| 7,257,108 | B2 | 8/2007 | Cheston et al. |
| 7,263,362 | B1 | 8/2007 | Young et al. |
| 7,272,669 | B2 | 9/2007 | Mattur et al. |
| 7,274,669 | B2 | 9/2007 | Czerwiec et al. |
| 7,280,032 | B2 | 10/2007 | Aekins et al. |
| 7,281,141 | B2 | 10/2007 | Elkayam et al. |
| 7,283,554 | B2 | 10/2007 | Ophir et al. |
| 7,292,859 | B2 | 11/2007 | Park |
| 7,293,103 | B1 | 11/2007 | Lin et al. |
| 7,299,287 | B1 | 11/2007 | Rubinstein et al. |
| 7,299,368 | B2 | 11/2007 | Peker et al. |
| 7,301,940 | B1 | 11/2007 | Bernstein |
| 7,305,006 | B1 | 12/2007 | Bella |
| 7,308,086 | B2 | 12/2007 | Yoshitani |
| 7,310,355 | B1 | 12/2007 | Krein et al. |
| 7,316,586 | B2 | 1/2008 | Anderson et al. |
| 7,324,824 | B2 | 1/2008 | Smith |
| 7,327,765 | B1 | 2/2008 | Ojard |
| 7,330,695 | B2 | 2/2008 | Karschnia et al. |
| 7,331,819 | B2 | 2/2008 | Nelson |
| 7,340,051 | B2 | 3/2008 | Phillips et al. |
| 7,343,506 | B1 | 3/2008 | Fenwick |
| 7,346,071 | B2 | 3/2008 | Bareis |
| 7,353,407 | B2 | 4/2008 | Diab et al. |
| 7,356,588 | B2 | 4/2008 | Stineman, Jr. et al. |
| 7,363,525 | B2 | 4/2008 | Biederman et al. |
| 7,368,798 | B2 | 5/2008 | Camagna et al. |
| 7,373,528 | B2 | 5/2008 | Schindler |
| 7,376,734 | B2 | 5/2008 | Caveney |
| 7,380,044 | B1 | 5/2008 | Liburdi |
| 7,382,786 | B2 | 6/2008 | Chen et al. |
| 7,404,091 | B1 | 7/2008 | Gere |
| 7,404,094 | B2 | 7/2008 | Lee et al. |
| 7,406,614 | B2 | 7/2008 | Peleg et al. |

(56) References Cited

U.S. PATENT DOCUMENTS

| | | |
|---|---|---|
| 7,408,949 B2 | 8/2008 | Baum |
| 7,483,524 B2 | 1/2009 | Binder |
| 7,633,966 B2 | 12/2009 | Binder |
| 7,636,373 B2 | 12/2009 | Binder |
| 7,653,033 B2 | 1/2010 | Beach et al. |
| 7,769,030 B2 | 8/2010 | Binder |
| 7,830,858 B2 | 11/2010 | Binder |
| 7,852,874 B2 | 12/2010 | Binder |
| 2001/0011314 A1 | 8/2001 | Gallagher et al. |
| 2001/0030470 A1 | 10/2001 | Waugh et al. |
| 2001/0039660 A1 | 11/2001 | Vasilevsky et al. |
| 2001/0047418 A1 | 11/2001 | White |
| 2002/0015489 A1 | 2/2002 | Ben-David |
| 2002/0021465 A1 | 2/2002 | Moore, Jr. et al. |
| 2002/0031114 A1 | 3/2002 | Terry et al. |
| 2002/0035624 A1 | 3/2002 | Kim |
| 2002/0038153 A1 | 3/2002 | Amodeo et al. |
| 2002/0039388 A1 | 4/2002 | Smart et al. |
| 2002/0057581 A1 | 5/2002 | Nadav |
| 2002/0059634 A1 | 5/2002 | Terry et al. |
| 2002/0063584 A1 | 5/2002 | Molenda et al. |
| 2002/0064039 A1 | 5/2002 | Clodfelter |
| 2002/0069417 A1 | 6/2002 | Kliger et al. |
| 2002/0076038 A1 | 6/2002 | Barrese et al. |
| 2002/0097821 A1 | 7/2002 | Hebron et al. |
| 2002/0104009 A1 | 8/2002 | Zodnik |
| 2002/0110236 A1 | 8/2002 | Karnad |
| 2002/0114325 A1 | 8/2002 | Dale et al. |
| 2002/0116720 A1 | 8/2002 | Terry et al. |
| 2002/0118676 A1 | 8/2002 | Tonnby et al. |
| 2002/0150100 A1 | 10/2002 | White et al. |
| 2002/0150155 A1 | 10/2002 | Florentin et al. |
| 2002/0154629 A1 | 10/2002 | Lohman et al. |
| 2002/0159402 A1 | 10/2002 | Binder |
| 2002/0166124 A1 | 11/2002 | Gurantz et al. |
| 2002/0166125 A1 | 11/2002 | Fulmer |
| 2002/0174423 A1 | 11/2002 | Fifield et al. |
| 2002/0180592 A1 | 12/2002 | Gromov |
| 2002/0194383 A1 | 12/2002 | Cohen et al. |
| 2002/0194605 A1 | 12/2002 | Cohen et al. |
| 2003/0039257 A1 | 2/2003 | Manis et al. |
| 2003/0048895 A1 | 3/2003 | Kiko et al. |
| 2003/0061522 A1 | 3/2003 | Ke et al. |
| 2003/0062990 A1 | 4/2003 | Schaeffer, Jr. et al. |
| 2003/0066082 A1 | 4/2003 | Kliger et al. |
| 2003/0099228 A1 | 5/2003 | Alcock |
| 2003/0107269 A1 | 6/2003 | Jetzt |
| 2003/0112965 A1 | 6/2003 | McNamara et al. |
| 2003/0133476 A1 | 7/2003 | Stone et al. |
| 2003/0146765 A1 | 8/2003 | Darshan et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2003/0198246 A1 | 10/2003 | Lifshitz et al. |
| 2003/0198341 A1 | 10/2003 | Smith et al. |
| 2003/0206623 A1 | 11/2003 | Deichstetter et al. |
| 2003/0207696 A1 | 11/2003 | Willenegger et al. |
| 2004/0013098 A1 | 1/2004 | Tseng et al. |
| 2004/0033817 A1 | 2/2004 | Gorsuch et al. |
| 2004/0073597 A1 | 4/2004 | Caveney et al. |
| 2004/0087214 A1 | 5/2004 | Cho |
| 2004/0107445 A1 | 6/2004 | Amit |
| 2004/0121648 A1 | 6/2004 | Voros |
| 2004/0136384 A1 | 7/2004 | Cho |
| 2004/0146061 A1 | 7/2004 | Bisceglia et al. |
| 2004/0147232 A1 | 7/2004 | Zodnik |
| 2004/0164619 A1 | 8/2004 | Parker et al. |
| 2004/0172658 A1 | 9/2004 | Rakib et al. |
| 2004/0198236 A1 | 10/2004 | Paine et al. |
| 2004/0204017 A1 | 10/2004 | Eckel et al. |
| 2004/0208167 A1 | 10/2004 | Kishida |
| 2004/0230846 A1 | 11/2004 | Mancey et al. |
| 2004/0232768 A1 | 11/2004 | Hung et al. |
| 2004/0236967 A1 | 11/2004 | Korcharz et al. |
| 2004/0250273 A1 | 12/2004 | Swix et al. |
| 2004/0268160 A1 | 12/2004 | Atkinson et al. |
| 2005/0047379 A1 | 3/2005 | Boyden et al. |
| 2005/0053087 A1 | 3/2005 | Pulyk |
| 2005/0063108 A1 | 3/2005 | Voll et al. |
| 2005/0073968 A1 | 4/2005 | Perlman |
| 2005/0076148 A1 | 4/2005 | Chan et al. |
| 2005/0078700 A1 | 4/2005 | Thompson et al. |
| 2005/0086389 A1 | 4/2005 | Chang |
| 2005/0097369 A1 | 5/2005 | Bowser et al. |
| 2005/0114325 A1 | 5/2005 | Liu et al. |
| 2005/0125083 A1 | 6/2005 | Kiko |
| 2005/0125507 A1 | 6/2005 | Atias et al. |
| 2005/0136972 A1 | 6/2005 | Smith et al. |
| 2005/0136989 A1 | 6/2005 | Dove |
| 2005/0150100 A1 | 7/2005 | Merdan et al. |
| 2005/0152306 A1 | 7/2005 | Bonnassieux et al. |
| 2005/0152323 A1 | 7/2005 | Bonnassieux et al. |
| 2005/0152337 A1 | 7/2005 | Wurtzel et al. |
| 2005/0177640 A1 | 8/2005 | Rubinstein et al. |
| 2005/0184915 A1 | 8/2005 | Nagel et al. |
| 2005/0201306 A1 | 9/2005 | Engel |
| 2005/0208825 A1 | 9/2005 | Chan |
| 2005/0228889 A1 | 10/2005 | Cohen et al. |
| 2005/0245127 A1 | 11/2005 | Nordin et al. |
| 2005/0268120 A1 | 12/2005 | Schindler et al. |
| 2005/0272372 A1 | 12/2005 | Rodriguez |
| 2005/0273790 A1 | 12/2005 | Kearney, III et al. |
| 2005/0281326 A1 | 12/2005 | Yu |
| 2006/0006817 A1 | 1/2006 | Chason et al. |
| 2006/0029210 A1 | 2/2006 | Feugere |
| 2006/0053324 A1 | 3/2006 | Giat et al. |
| 2006/0056444 A1 | 3/2006 | Binder |
| 2006/0079969 A1 | 4/2006 | Seguin |
| 2006/0089230 A1 | 4/2006 | Biederman et al. |
| 2006/0104291 A1 | 5/2006 | Rodriguez et al. |
| 2006/0165097 A1 | 7/2006 | Caveney |
| 2006/0168459 A1 | 7/2006 | Dwelley et al. |
| 2006/0181398 A1 | 8/2006 | Martich et al. |

OTHER PUBLICATIONS

"DOCSIS-Bridging Configuration, Chapter 2 Cisco uBR905/uBR925 Cable Access Router Software Configuration Guide", 1-10, Jul. 1, 2001.

Tanaka, Mosaoki, "High Frequency Noise Power Spectrum, Impedance and Transmission Loss of Power Line in Japan on Intrabuilding Power Line Communications" IEEE Transactions on Consumer Electronics, vol. 34, No. 2, pp. 321-326, May 1, 1988.

Barstow, J.M., "A Carrier Telephone System for Rural Service", AIEE Transcations, 1947, vol. 66, pp. 301-307, Jan. 1, 1947.

Wimer, W., "Clarifications and Extensions for the Bootstrap Protocol, Request for Comments 1542", Carnegie Mellon University, Oct. 1993, 1-23.

3COM, "48 Volt DC Power Supply Connection Guide for the SuperStack II Switch 3900", pp. 1-12, Mar. 1, 2000.

Cisco Systems, "Quick Start Guide: Cisco 2610 Router Cabling and Setup", 18 pages, Jan. 1, 1998.

"Release Notes for Cisco uBR904 Cable Access Router for Cisco IOS Release 12.0(7)T", Text Part No. 78-6482-04, 1-30, Dec. 13, 1999.

Hatori, Mitsutoshi et al, "Home Informatization and Standardization of Home Bus", IEEE Transactions on Consumer Electronics, CE-32, No. 3, pp. 542-549, Aug. 1, 1986.

Cervenka, Dana, "Building Cablephone Systems Piece by Piece", CED: Communications Engineering and Design, 6 pages, Mar. 1, 1996.

"Draft IS-60.04 Node Communications Protocol; Part 6: Application Layer Specification", 129 pages, Apr. 18, 1996.

"uBR900 Cable Modem Error Messages, Document ID: 43063", 1-5, Nov. 4, 2008.

"LonWorks Router User's Guide Revision 3", Echelon Corporation, 68 pages, Jan. 1, 1995.

"VISPLAN-10 Infrared Wireless LAN System"; JVC, 10 pages, May 1, 1996.

"PL DSK 2.1 Power Line Smart Transceiver Development Support Kit User's Guide", Echelon Corporation, 2005-2006, 18 pages, Jan. 1, 2005.

(56) References Cited

OTHER PUBLICATIONS

"Motorola CableComm CyberSURFR Cable Modem Specifications", 4 pages, Apr. 1, 1998.
Platt, Richard, "Why IsoEthernet Will Change the Voice and Video Worlds", IEEE Communications Magazine, vol. 34, Issue 4, Apr. 1996, 55-59.
"Marketing Assessment Presentation Entitled Powerline Telecommunications", 9 pages, Jul. 16, 2002.
Fanshawe, David G.J., "Architectures for Home Systems", Conference, IEEE Colloquium on Home Systems—Information, Entertainment and Control, London, United Kingdom, 4 pages, Oct. 1, 1990.
Sado, W.N. et al, "Personal Communicaitons on Residential Power Lines—Assessment of Channel Parameters"; Fourth IEEE International Conference, pp. 532-537, Nov. 6, 1995.
"DSLPipe Reference Guide"; by Ascend Communications, 162 pages, Jun. 2, 1997.
NetSpeed, "Speed Runner 202 Customer Premise ATM ADSL Router", 1-4, Jan. 1, 1997.
*Serconet, Ltd.,* v. *Netgear, Inc.* Case No. CV-06-04646 PJH, Claim Comparison Chart for USP 7,035,280, 1-124, Jan. 29, 2007.
"Webstar TM DPX2203CTM and EPX2203C TM VOIP Cable Modem User'S Guide", 1-52, May 1, 2005.
"Intellon Corporation Test Summary for Transformerless Coupler Study", Intellon No News Wires, DOT/NHTSA Order No. DTNH22-98-P-07632, pp. 1-18, Dec. 24, 1998.
"Air Connect Access Point User Guide, Version 1.0", 1-90, Jan. 1, 2000.
"Quick Installation and Reference for the Model RPSU Redundant Power Supply Unit", Bay Networks, Sep. 1995, 1-15.
"The Mac Reborn; Macworld Sep. 1996", 104-115, Sep. 1, 1996.
"White Paper on Medium Voltage Powerline Communication (PLC) Networks" CIGRE SC D2 WG 14, Broadband PLC, pp. 1-58, Mar. 1, 2005.
Zakowski, Wayne A., "IEEE 802.9 Draft Standard Integrated Services (IS) LAN Interface at the MAC and PHY Layers (IEEE Unapproved Draft)", 1-502, Nov. 8, 1992.
"DPX2213 TM VOIP Cable Modem User'S Guide", 1-52, Aug. 1, 2006.
"IEEE 802.9, IEEE Standards for Local and Metropolitan Area Networks: Integrated Services (IS) LAN Interface at the Medium Access Control (MAC) and Physical (PHY) Layers, IEEE Standard 802.9", 1994, 437 pages.
"Using the LonWorks PLT-22 Power Line Transceiver in European Utility Application", Version 1, Echelon Coporation 1996-1999, 118 pages, Jan. 1, 1996.
Cisco Systems, "Cisco Catalyst 5000 Product Announcement : Industry's First Modular, Multilayer-Capable Switching System for the Wiring Closet", 22 pages, Jan. 1, 1996.
"Installing the Cisco uBR924 Router, Chapter 3, Cisco uBR924 Router Hardware Installation Guide", 1-16, Mar. 1, 2000.
"New and Changed Commands Reference, Appendix D", Cisco uBR905/uBR925 Cable Access Router Software Configuration Guide, 1-52, Jul. 1, 2001.
Onunga, J. et al, "Distribution Line Communications Using CSMA Access Control with Priority Acknowledgements" IEEE Transactions on Power Delivery, vol. 4, No. 2, pp. 878-886, Apr. 1, 1989.
Funkschau, "CEBus: US Households Are Being Networked", Funkschau, No. 9, 4 pages, Apr. 21, 1989.
3COM, "3ComImpact IQ External ISDN Modem User Guide", 158 pages, Jul. 1, 1997.
Mandeville, Robert et al, "Canned Heat: High Stress Tests Turn Up High-Speed Switches That Burn Through Backbone Bottlenecks", Data Communications of the Web, 10 pages, Feb. 1, 1996.
Na, "Universal Serial Bus Specification"—Rev.1.0 , Sec. 7.2.1-7.2.1.5 pp. 131-135, Jan. 15, 1996.
"LonWorks LPI-10 Link Power Interface Module User's Guide", Echelon Corporation, 37 pages, Jan. 1, 1995.
Lokken, G. et al, "The Proposed Wisconsin Electric Power Company Load Management System Using Power Line Carrier Over Distribution Lines", 1976 National Telecommunications Conference, IEEE , 21-12.2-3, Jan. 1, 1976.
"AT and T Practice, SLC 96 Subscriber Loop Carrier System, Remote Terminal Pair Gain Systems", Select Code 363-202-401, Issue 1, Feb. 1982, 506 pages.
"Series V: Data Communication Over the Telephone Network: Interface and Voiceband Modems", 74 pages, Oct. 1, 1996.
"Power Line Communications Solutions" Copyrgt 2002, 2 pages, Jan. 1, 2002.
RAD Data Comm. Ltd., "Token Ring Design Guide", #TR-20-01/94, chapters 1 through 4-21, Jan. 1, 1994.
"Demand Side Management with LonWorks Power Line Transceivers", LonWorks Engineering Bulletin, Echelon Corporation, 36 pages, Dec. 1, 1996.
"Ascend DSLPipe-S Specifications", 1997.
"HomePlug TM Powerline Alliance, HomePlug 1.01 Specification", 139 pages, Dec. 1, 2001.
"Upgrading Cisco I0S Software on a uBR900 Series Cable Modem, Document ID: 107613", 1-5, Sep. 26, 2003.
"White Paper on Medium Voltage Powerline Communication (PLC) Networks Annexes" CIGRE SC D2 WG 14, Broadband PLC, pp. 1-15, Apr. 1, 2005.
Cooper, Edward, "Broadband Network Technology—An Overview for the data and Telecommunications Industries", Sytek Systems, Mountain View CA, 4 pages, Jan. 1, 1984.
"DPR2325, EPR2325, DPR2320, and EPR2320 Cable Modem Gateway With Wireless Access Point User's Guide", 1-125, Aug. 1, 2006.
"JVC Introduces First Ethernet Compatible Wireless LAN System"; Business Wire, 1 page, Nov. 7, 1995.
Cisco Systems, "CiscoPro EtherSwitch CPW2115", 4 pages, Dec. 1, 1995.
"Intelogis to Present on Stage at Internet Showcase 1998" PR Newswire, 1 pages, Jan. 28, 1998.
"Deliver Secure, High-Speed DOCSIS Data and Voice Commercial Services With the Cisco uBR900 Series Cable Access Router Data Sheet", 1-4, Sep. 1, 2001.
Hunt, John M. et al, "Electrical Energy Monitoring and Control System for the Home" IEEE Transactions on Consumer Electronics, vol. CE-32, No. 3, pp. 578-583, Aug. 1, 1986.
"Advanced Data-Only Configurations, Chapter 3", Cisco uBR905/uBR925 Cable Access Router Software Configuration Guide, 1-16, Jul. 1, 2001.
"Cisco 1805 DOCSIS 2.0 Cable Router, Quick Start Guide", 1-4, Jan. 1, 2007.
Stallings, William, Local Networks (Third Edition), 1990, 1-534.
Liu, Er et al, "Broadband Characterization of Indoor Powerline Channel", Communications Laboratory , Helsinki Univeristy of Technology, Finland (presented at the 2004 International Symposium on PowerLine Communications and its Applications, Zaragoza, Spain,), 6 pages, Mar. 31, 2004.
Lim, C. K. et al, "Development of a Test Bed for High-Speed Power Line Communications", School of Electrical and Electronic Egineering, Nanyang Technological University, Singapore, IEEE, pp. 451-456, Jan. 1, 2000.
Coakley, N.G. et al, "Real-Time Control of a Servosystem Using the Inverter-Fed Power Lines to Communicate Sensor Feedback", IEEE Transactions on Industrial Electronics, pp. 360-369, Jan. 1, 1999.
Horowitz, Paul et al, "Art of Electronics", Second Edition, Cambridge University Press, 1989, pp. 1-1153.
International Telecommunication Union, "ISDN User-Network Interfaces—Reference Configurations", I.411, Mar. 1993, 11 pages.
"SuperStack II Baseline Switch User Guide", 3Com, 8 pages, Mar. 1, 1998.
"LonWorks for Audio Computer Control Network Applications", Echelon Corporation, 30, Jan. 1, 1995.
Inoue, M et al, "The Melon Home Automation Housekeeping System", Mitsubishi Denki Giho, vol. 63, No. 2, pp. 36-41, Jan. 1, 1989.
Burranscano, P et al, "Digital Signal Transmission on Power Line Carrier Channels: An Introduction", IEEE Transactions on Power Delivery, vol. PWRD-2, No. 1, pp. 50-56, Jan. 1, 1987.

(56) References Cited

OTHER PUBLICATIONS

Hoe-Young, Noh, "Home Automation", Korea Information Science Society Review, vol. 7 No. 2 pp. 40-44, Republic of Korea., 1-14, Apr. 1, 1989.
"LonWorks 78kbps Self-Healing Ring Architecture", LonWorks Marketing Bulletin, Echelon Coporation, 6 pages, Aug. 1, 1993.
"Texas Instruments: System Block Diagrams; Power Line Communication (Generic)", Copyrgt 1995-2002, 1 page, Jan. 1, 1995.
"IEEE 802.1D, IEEE International Standard: Information Technology—Telecommunications and Information Exchange Between Systems—Local Area Networks—Media Access Control (MAC) Bridges", 181 pages, Jul. 8, 1993.
"Universal Serial Bus Specification Revision 1.0" pp. 29-30, Sec 4.2.1, Jan. 15, 1996.
"*Serconet LTD* V *Netgear Inc*" Case No. CV-06-04646 PJH Claim Comparison Chart for USP 7,016,368, 1-105, Jan. 29, 2007.
"Ethernet Wireless LAN Systems"; BYTE, 3 pages, Feb. 1, 1996.
"Dedicated Passive Backbone for Power Line Communications", IBM Technical Disclosure Bulletin, pp. 183-185, Jul. 1, 1997.
Adaptive Networks, Inc., "AN1000 Powerline Network Communications Chip Set", 1-29 pages, Jan. 1, 1995.
3COM, "3Com NBX 2101 PE Basic Phone Product Details", pp. 1-3, Jan. 18, 2007.
Wakerly, John F., A Voice/Data/Packet Switching Architecture, David Systems, Inc., 1985, 6 pages.
"Overview, Chapter 1", Cisco uBR905/uBR925 Cable Access Router Software Configuration Guide, 1-18, Jul. 1, 2001.
Azzam, Albert A., High-Speed Cable Modems, pp. 247-570, ISBN: 0-07-006417-2, 1-321, Jan. 1, 1997.
Media Access Control (MAC) Parameters, Physical Layer, Medium Attachment Units, and Repeater for 100 Mb/s Operation, Type 100BASE-T (Clauses 21-30); IEEE Standards for Local Metropolitan Area Networks: Supplement to Carrier Sense Multiple Access with Collision Detection (CSMA/CD) Access Method and Physical Layer Specifications; 1995, 200 pages.
"IEEE P802.9af, Draft Standard for Local and Metropolitan Area Networks—Supplement to Integrated Services (IS) LAN Interface at the Medium Access Control (MAC) and Physical (PHY) Layers", 1997, 1-34.
"Claim Chart presented in request for reexamination of U.S. Patent No. 6,480,510 request filed", Jun. 10, 2009.
"Beginners FAQ for uBR900 Series Cable Modem End Users, Document ID: 14561", 1-2, Oct. 31, 2008.
"David Information Manager Technical Overview", Sep. 1988, pp. 1-74.
"AT and T Practice, SLC 24 and 96 Carrier Systems, Channel Unit Installation, Loop Transmission Systems", Select Code 363-202-402, Issue 2, Jul. 1985, 335 pages.
Droms, R., "Dynamic Host Configuration Protocol (DCHCP) Request for Comments 1531", Bucknell University, Oct. 1993, 1-40.
"Signalling on Low-Voltage Electrical Installations in the Frequency Band 3kHz to 148.5 kHz-Part 4: Filters at the Inferface of the Indoor and Outdoor Electricity Network", CLC SC 105A (Secretariat), pp. 1-11, May 1, 1992.
Campbell, Chris, "Building a Business Case for PLC: Lessons Learned From the Communication Industry Trenches", KPMG Consulting, 5 pages, Jul. 16, 2002.
"HiGain Remote Unit, Engineering Services Technical Practice Section 150-412-181-01, Revision 01", 42 pages, Mar. 31, 1998.
"Introduction to Pyxos FT Platform", Echelon Corporation 2007, 34 pages, Jan. 1, 2007.
Gunnerson, Gary, "Switching Hubs-Switching to the Fast Track", PC Magazine, 24 pages, Oct. 11, 1994.
Plexeon Logistics, Inc. "Power Line Communications", Copyrgt 1998-2003, 2 pages, Jan. 1, 1998.
Heite, C et al, "Powernet-Das Neue Eib-Medium", Elektrotechnik und Informationstechnik, Spinger Verlag, Wein, AT, vol. 114,. No. 5, pp. 254-257, Jan. 1, 1997.
"HomePlug TM Powerline Alliance, HomePlug 0.5 Draft Medium Interface Specification", 133 pages, Nov. 28, 2000.

Cisco Systems, "Cisco Catalyst 5000: Industry's First Modular, Multilayer-Capable Switching System for the Wiring Closet" , pp. 1-22, May 16, 1996.
"IP Addressing on the Workgroup Catalyst 1200 Series", cisco.com, Aug. 1995, 1-2.
Esmailian, T. et al, "A Discrete Multitone Power Line Communications System", Department of Electrical and Computer Engineering, University of Toronto, Ontario, Canada, 2000 IEEE, pp. 2953-2956, Jan. 1, 2000.
"Universal Serial Bus Specification Revision 1.0." Sec. 9.6.2 pp. 184-185, Jan. 15, 1996.
Fogarty, Kevin, "Zap! NetWare users get really wired—over electric power lines", Network World. , 1-2, Jul. 3, 1995.
"Embedded Power Line Carrier Modem", Archnet Electronic Technology, Copyrgt 2001, 3 pages, Jan. 1, 2001.
Hogan Lovells US LLP, "U.S. ITC Complaint in the Matter of Certain Equipment for Communications Networks, Including Switches, Routers, Gateways, Bridges, Wireless Access Points, Cable Modems, IP Phones and Products Containing Same", 1-59, May 13, 2011.
"uBR900 Cable Modem Performance Issues, Document ID: 43062", 1-5, Oct. 31, 2008.
"*Cisco Systems, Inc.* v. *Mosaid Technologies Inc.*—Complaint for Declaratory Judgement" (full version of the Complaint having been filed under seal and thus unavailable to the public), 23 pages, Aug. 16, 2010.
Kim, Woo-Seop et al, "A Control Network Architecture Based on EIA-709.1 Protocol for Power Line Data Communications", IEEE Transactions on Consumer Electronics, vol. 48, No. 3 , pp. 650-655, Aug. 1, 2002.
Sheets, William et al, "Carrier Current Audio Transmitter", Radio Electronics, 5 pages, Jan. 1, 1989.
"SuperStack II Entry Hub User Guide", 3Com, pp. 1-8, Nov. 1, 1996.
SX-200 Digital PABX/General Description 9109-094-100-NA, Issue 4, Revision 1, pp. 1-46, Nov. 1, 1990.
Ascend Communications, Inc., "Ascend DSLPipe-S Features", 2 pages, May 12, 1997.
"PassPort PC Plug in Quick Setup Guide", Intelogis P/N 30030202, 1998, 8 pages.
"ITU-T 1.430 Integrated Services Digital Network—Basic User-Network Interface—Layer 1 Specification.", 1-106, Jan. 1, 1996.
SX-200 Digital and SX-200 Light PABX, General Information Guide Lightware 15, 9109-952-006-NA, Issue 1, Revision 0, pp. 1-222, Mar. 1, 1992.
Bell, Robert, IEEE P802.9F Draft Standard for Local and Metropolitan Area Networks—Supplement to Integrated Services (IS) LAN Interface at the Medium Access Control (MAC) and Physical (PHY) Layers, Nov. 1996, pp. 1-22.
"Universal Serial Bus Specification", Revision 1.0, 268 total pages, Jan. 15, 1996.
Eldering, Charles et al, "Engineering Requirements for Hybrid Fiber—Coax Telephony Systems", 1994 National Cable Television Association Show, May 1994, 219-231.
Mandeville, Robert et al, "Forget the Forklift", Data Communications, 11 pages, Sep. 1, 1996.
International Telecommunication Union, "ISDN User-Network Interfaces—Interface Structures and Access Capabilities", I.412, 1988, 7 pages.
"Release Notes for Cisco uBR904 Cable Access Router for Cisco IOS Release 11.3NA", Text Part No. 78-5546-09, 1-22, Aug. 9, 1999.
"End of Sales, Engineering, and Life for the Cisco uBR924 Cable Access Router", 1-4, Jul. 11, 2001.
"*Serconet LTD* V *Netgear Inc*" Case No. CV-06-04646 PJH, Claim Comparison Chart for USP 6,480,510, 1-37, Jan. 29, 2007.
"Compaq Deskpro 4000S Series of Personal Computers", 1-133, Jul. 1, 1997.
Bell, Robert, "IEEE Standards Project, P802.9F Draft Standard for Local and Metropolitan Area Netoworks—Supplement to Integrated Services (IS) LAN Interface at the Medium Access Control (MAC) and Physical (PHY) Layers", 1-34, Jul. 8, 1997.
*Serconet, Ltd.,* v. *Netgear. Inc.* Case No. CV-06-04646 PJH, Defendant's Invalidity Contentions, 1-15, Jan. 29, 2007.

(56) References Cited

OTHER PUBLICATIONS

"IEEE 802.9A, IEEE Standards for Local and Metropolitan Area Networks: Supplement to Integrated Services (IS) LAN Interface at the Medium Access Control (MAC) and Physical (PHY) Layers: Specification of ISLAN16-T", 344 pages, Feb. 16, 1996.
Rivkin, Steven R, "Co-Evolution of Electric and Telecommunications Networks", The Electricity Journal , pp. 71-76, May 1, 1998.
LAN Emulation, 16 pages, Nov. 15, 1995.
SX-200 Digital PABX/Circuit Card Descriptions 9109-094-125-NA, Issue 4, Revision 1, pp. 1-48, Nov. 1, 1990.
"Setting up MacIP", cisco.com, May 1995, 1-6.
Oneal Jr., J.B., "The Residential Power Circuit as a Communication Medium", IEEE Transactions on Consumer Electronics, vol. CE-32, No. 3, pp. 567-577, Aug. 1, 1986.
"SuperStack II PS Hub User Guide"; 3Com, 188 pages, Jul. 1, 1997.
Feduschak, Natalia A., "Waiting in the Wings: Is Powerline Technology Ready to Compete with Cable?", 5 pages, Mar. 1, 2001.
Amada, Eiichi et al, "An Integrated PABX/LAN System Architecture", Communications, 1988, ICC ' 88, Digital Technology—Spanning the Universerse, Conference Record, IEEE International Conference, vol. 3., Jun. 1988, 1533-1538.
International Telecommunication Union, "ISDN User-Network Interfaces—Basic User-Network Interface—Layer 1 Specification", I.430, Mar. 1993, 106 pages.
"Connector and Cable Specifications, Appendix B, Cisco uBR924 Router Hardware Installation Guide", 1-6, Mar. 1, 2000.
Chang, S.S.L., "Power-Line Carrier", Fundamentals Handbook of Electrical and Computer Engineering, vol. II Communication, Control, Devices and Systems, John Wiley and Sons, New York, pp. 617-627, Jan. 1, 1983.
De Wilde, W.R. et al, "Upwards to a Reliable Bi-Directional Communication Link on the LV Power Supplies for Utility Services: Field Tests in Belgium", Sixth International Conference, pp. 168-172, Apr. 3, 1990.
Yoshitoshi, M et al, "Proposed Interface Specifications for Home Bus", IEEE Transactions on Consumer Electronics, vol. CE-32, No. 3, pp. 550-557, Aug. 1, 1986.
Naredo, J.L et al, "Design of Power Line Carrier Systems on Multitransposed Delta Transmission Lines" IEEE Transactions on Power Delivery. vol. 6. No. 3, pp. 952-958, Jul. 1, 1991.
-, "Technical Report TR-001 ADSL Forum System Reference Model", 6 pages, May 1, 1996.
"AT and T Practice, SLC 96 Carrier System, Maintenance Pair Gain System", Select Code 363-202-500, Issue 1, Aug. 1983, 497 pages.
Cisco Systems, Inc., Respondents' Notice of Prior Art (Redacted); in the Matter of Certain Equipment for Communications Networks, Including Switches, Routers, Gateways, Bridges, Wireless Access Pointes, Cable Modems, IP Phones and Products Containing Same; ITC Investigation No. 337-TA-778, 86 pages, Aug. 12, 2011.
"IEEE Guide for Power-Line Carrier Applications, ANSI/IEEE Std 643-1980", Copyrgt 1980 by The Institute of Electrical and Electronics Engineers, Inc. , pp. 1-84, Jan. 1, 1980.
"SuperStack II Desktop Switch", 3Com, 1-2, Sep. 1, 1996.
Summary of an IEEE Guide for Power-Line Carrier Applications, A Report by the Power System Communications Committee, IEEE Transactions on Power Apparatus and Systems, vol. PAS-99, No. 6, pp. 2334-2337, Nov. 1, 1980.
"Configuring the uBR900 Series Modem, Document ID: 43060", 1-11, Oct. 31, 2008.
"Motorola Announces Key New Features to CyberSURFR Cable Modem System", Motorola, 3 pages, Mar. 17, 1997.
"PL3120/PL3150 Power Line Smart Transceiver Data Book", Version 2, Echelon Corporation, 1996-2005, 255 pages, Jan. 1, 1996.
"Superstack II Baseline Switch 610 User Guide", 3Com, pp. 1-54, May 1, 1999.
Hasler, E.F. et al, "Communication Systems Using Bundle Conductor Overhead Power Lines", IEEE Transactions on Power Apparatus and Systems, vol. PAS-94, No. 2, pp. 344-349, Mar. 1, 1975.
Wakerly, John F. et al, "Attaching RS-232 and LAN Capabilities to an Existing Voice-Only Switching Network", published as early as 1985, pp. 1-11.
Adaptive Networks, Inc., "AN1000EVK Evaluation Unit Manual, Draft 1.0", 31 pages, Aug. 1, 1996.
Burr, A.G, et al, "Effect of HF Broadcast Interference on PowerLine Telecommunications Above 1 MHZ" Copyrgt 1998 IEEE, pp. 2870-2875, Jan. 1, 1998.
Burranscano, P et al, "Performance Evaluation of Digital Signal Transmission Channels on Coronating Power Lines"Copyrgt 1988 IEEE, pp. 365-368, Jan. 1, 1988.
Shimizu, Hiroshi et al, "IVDLAN Standardization and Development", IEICE Transactions on Communications, vol. E74-B, No. 9, Sep. 1991, 2696-2702.
SX-200 Digital PABX/Features Description 9109-094-105-NA, Issue 4, Revision 1, pp. 1-350, Nov. 1, 1990.
Gutzwiller, F.W. et al, "Homenet: A control Network for Consumer Applications", IEEE Transactions on Consumer Electronics, vol. CE-29, No. 3, pp. 297-304, Aug. 1, 1983.
Cisco Systems, "Catalyst 5000 ATM Dual PHY LAN Emulation Module", pp. 1-4, Sep. 24, 1996.
Okazaki, Hideaki et al, "A Transmitting and Receiving Method for CDMA Communications Over Indoor Electrical Power Lines", IEEE, pp. 522-528, Mar. 1, 1998.
Kosiur Dave et al, "Macworld Networking Bible", Second Edition, pp. 1-331, Jan. 1, 1994.
Brightfield, Keith, Power Line Communications Conference Entitled, "PLC, A New Competitor in Broadband Internet Access", Washington DC, 60 pages, Dec. 11, 2001.
"End-Of-Sale and End-Of-Life Announcement for the Cisco 1841 DOCSIS 2.0 Cable Modem Bundles", 1-2, Dec. 1, 2008.
Cervenka, Dana, Cablephone Not Ringing Yet; CED: Communications Engineering and Design, Mar. 1995, pp. 32, 33, 34, 36, 38, 40 and 42.
Held, Gilbert, "High Speed Networking with LAN Switches"pp. 1-290, Jan. 1, 1997.
"DPC2203 and EPC2203 VOIP Cable Modem User'S Guide", 1-58, Oct. 1, 2006.
"Continuation of IBM LAN Bridge and Switch Summary", Jan. 1996, 1-70.
Chen, Y.F. et al, Baseband Transceiver Design of a 128-Kbps Power-Line Modem for Household Applications, IEEE Transactions, 17 (2), 338-344, Apr. 1, 2002.
Piety, Robert A., "Intrabuilding Data Transmission Using Power-Line Wiring", Hewlett-Packard Journal, pp. 35-40, May 1, 1987.
"SuperStack II Desktop Switch User Guide"; 3Com, 148 pages, Jun. 1, 1997.
Cisco Systems, Catalyst 5000 Group Switching Ethernet Modules, 5 pages, May 6, 1996.
"Hardware Troubleshooting for Cisco uBR9XX Series Cable Modems, Document ID: 10154", 1-3, Oct. 4, 2005.
Metcalfe, Bob, From the Ether-Bob Mecalfe, Cheap, reliable 'net connections may be as close as an electrical socket, by Bob Metcalfe Info World, vol. 19, Issue 6, 4 pages, Feb. 10, 1997.
Fausti, A. et al, "Remote Powered Data Transmission System, Telecommunications Energy Conference", Intelec ' 89, Conference Proceedings, Eleventh International, vol. 2, Oct. 1989, 1-5.
N/A, "SuperStack II Baseline 10/100 Switch User Guide", 3Com, pp. 1-8, May 1, 1998.
"Cisco Model DPC2607 and EPC2607 Channel-Bonded EMTA User Guide", 1-51, Feb. 1, 2008.
"IBM LAN Bridge and Switch Summary", Jan. 1996, 208 pages.
Mitel, ISO-CMOS ST-BUS Family, MT8971B/72B; Digital Subscriber Interface Circuit/Digital Network Interface Circuit; Issue 7, p. 1-21, May 1, 1995.
"Cisco Systems, Inc., Cisco Consumer Products LLC, Scientific-Atlanta LLD, and Cisco Systems International B.V.'S Response to Complaint of Mosaid Technologies Inc., Response to Complaint", Investigation No. 337-TA-778, 1-72, Jul. 21, 2011.
Evans, Grayson , "The CEBus Standard Users Guide, 1st Edition", 317 pages, pp. 1-317, May 1, 1996.
"David Co-Net Command Reference, Revision A, Doc No. 7915-08", 1-342, Dec. 1, 1988.
"EMETCON Automated Distribution System: Communications Guide", Westinghouse ABB Power T7D Company Technical Manual 42-6001A, 55 pages, Sep. 1, 1989.

(56) References Cited

OTHER PUBLICATIONS

Abraham, K.C. et al, "A Novel High-Speed PLC Communication Modem", IEEE Transactions on Power Delivery, pp. 1760-1767, Oct. 1, 1992.
David Systems, David Information Manager—Overview, 1986, pp. 1-38.
International Telecommunication Union, "ISDN User-Network Interface Data Link Layer—General Aspects", CCITT, Q.920, Nov. 1988, 20 pages.
Meng, H. et al, "A Transmission Line Model for High—Frequency Power Line Communication Channel" IEEE, pp. 1290-1295, Jan. 1, 2002.
"Ascend Pipeline 25 ISDN Remote LAN Access, Bandwidth on Demand, Getting Started Guide", 111 pages, Aug. 18, 1995.
Held, Gilbert, "The Complete Modem Reference: The Technician's Guide to Installation, Testing, and Trouble-Free Communications", Third Edition, pp. 1-488, Jan. 1, 1997.
Echelon Corporation, "Centralized Commercial Building Applications with the LonWorks PLT-21 Power Line Transceiver", LonWorks Engineering Bulletin, Echelon Corporation, 22 pages, Apr. 1, 1997.
Kosiur Dave, et al, "Macworld Networking Bible", Second Edition, pp. 332-687, Jan. 1, 1994.
"HomePlug.TM.Powerline Alliance, HomePlug Initial Draft Medium Interface Specification", 104 pages, Jul. 27, 2000.
"Data Xcellerator Cable Modem User'S Guide", 1-46, Apr. 1, 1997.
Cisco Systems, "Catalyst 5000 ATM LAN Emulation Module: Data Sheet", 2 pages, Nov. 1, 1995.
"Recall, End of Sales, End of Engineering and End of Life for Cisco uBR914 Cable Data Service Unit, Product Bulletin, No. 1380", 1-2, Aug. 1, 2001.
Wakerly, John, TSBUS Signal Specifications, Rev. 4; D.A.V.I.D. Systems, Inc., pp. 1-8, May 7, 1985.
Kawamura, A et al, "Autonomous Decentralized Manufacturing System Using High-Speed Network with Inductive Transmission of Data and Power", IEEE, pp. 940-945, Jan. 1, 1996.
"Fast Ethernet 100 Mbps Solutions", Posted March, 10 pages, Mar. 1, 1996.
Cisco Systems, "Cisco Catalyst 5002 Switching System", 1999, 4 pages.
"Preface, Cisco uBR905/uBR925 Cable Access Router Software Configuration Guide", 1-12, Jul. 1, 2001.
"Miscellaneous Questions About uBR900 Series Cable Modems, Document ID: 107616", 1-3, Oct. 31, 2008.
Perlman, Radia, "Interconnections Bridges and Routers", ISBN: 0-201-56332-0, 393 pages, Jan. 1, 1992.
"Model DPX203TM and EPX2203 TM VOIP Cable Modem User'S Guide", 1-51, Aug. 1, 2006.
Wakerly, John, TNIM Timeslot Allocation; D.A.V.I.D. Systems, Inc., pp. 1-3, Apr. 18, 1983.
"Cisco uBR900 Series Cable Access Router Q and A, Revision 1", 1-5, Nov. 15, 2001.
Markwalter, Brian E. et al, CEBus Router Testing, IEEE Transactions on Consumer Electronics, vol. 37, No. 4, 8 pages, Nov. 1, 1991.
Suranyi, Gabriel G., "The Need for Home Power: It Is Just Around the Corner", Telecommunications Energy Conference, INTELEC, 19th International, Oct. 1997, 80-86.
Network Based Exchange—The Complete Communications Solution, NBX Corporation, 16 pages, Jan. 1, 1997.
"JVC Introduces Ethernet Compatible Wireless LAN System"; Business Wire, 1 page, Sep. 25, 1995.
Archnet Technology Ltd., "Archnet: Automatic Meter Reading System Power Line Carrier Communication", 3 pages, Jan. 1, 2001.
Nichols, Keith, "Line Carrier Modems—1: Build a Pair of Line-Carrier Modems (Part 1)", Radio Electronics, 7 total pages, Jul. 1, 1988.
Nichols, Keith, "Line Carrier Modems—2: Build a Pair of Line-Carrier Modems (Part 2)", Radio Electronics, 5 total pages, Aug. 1, 1988.
Ross, Floyd E. et al, "IsoEthernet: An Integrated Services LAN", IEEE Communications, vol. 34, Issue 8, Aug. 1996, 74, 79-84.
Dostert, Klaus, "Powerline Communications" Ch. 5, Prentice Hall PTR, Upper Saddle River NJ Copyrgt 2001, pp. 286, 288-292, Jan. 1, 2001.
Echelon Corporation, "Building a Lon Talk-to-PLC Gateway", Lon Works Engineering Bulletin, 1-63, May 1, 1994.
"LTM-10A User's Guide", Revision 4, Echelon Coporation, 1995-2001, 46 pages, Jan. 1, 2010.
"The Mac Reborn", Macworld, vol. 13, Issue 9., pp. 1-10, Sep. 1, 1996.
"Using Cisco Ios Software, Appendix A", Cisco uBR905/uBR925 Cable Access Router Software Configuration Guide, 1-12, Jul. 1, 2001.
Kong, Isaac et al, "Cablenet: A Local Area Network Reservation Scheme", Digest of Papers Spring Compcon 82, High Technology in the Information Industry, IEEE Computer Society International Conference, Feb. 22, 1982.
Bearfield, J.M., "Control the Power Interface of USB's Voltage Bus", Electronic Design, U.S. Penton Publishing, Clev. Ohio, vol. 45, No. 15, pp. 80, 82, 84 and 86, Jul. 1, 1997.
"Using the Cable Monitor Tool, Appendix B", Cisco uBR905/uBR925 Cable Access Router Software Configuration Guide, 1-24, Jul. 1, 2001.
Tanaka, Masaoki, "Transmission Characteristics of a Power Line Used for Data Communications at High Frequencies", IEEE Transactions on Consumer Electronics, vol. 35, No. 1, pp. 37-42, Feb. 1, 1989.
IEEE Standard for a High Perfomance Serial Bus; IEEE Std. 1394-1995, 392 pages, Jul. 22, 1996.
International Telecommunication Union, "ISDN User-Network Interface Data Link Layer Specification" CCITT, Q.921, Nov. 1988, 118 pages.
Hachman, Mark, "Compaq to Ride the CEBus", EBN, 1 page, Jan. 22, 1996.
"LonWorks LPT-10 Link Power Transceiver User's Guide Version 2.1", Echelon Corporation, 60 pages, Jan. 1, 1995.
Drudy, Francis, "Considerations and Recommendations on Power Feeding at AN 802.9", IEEE 802.9—IVD LAN Interface Working Group, Reference IEEE 802.87*9.618, 1-6, Nov. 5, 1987.
Hofman, J., "Cable, Television, and the Consumer Electronic Bus":, Panasonic Technologies Inc., 9 Pages, Jun. 11, 1987.
"Connectivity Problems for uBR900 Cable Modems, Document ID: 43061", 1-5, Oct. 31, 2008.
"David Information Manager System Description Manual, Revision A", 1-114, Mar. 1, 1987.
"US Robotics Courier V. Everything External Modem—Getting Started Guide", 1-64, Apr. 1, 1996.
Azzam, Albert A., High-Speed Cable Modems, pp. 1-246, ISBN: 0-07-006417-2, 1-276, Jan. 1, 1997.
Marthe, Emmanuel et al, "Indoor Radiated Emission Associated with Power Line Communication Systems", Swiss Federal Institute of Technology Power Systems Laboratory IEEE, pp. 517-520, Jan. 1, 2001.
"Technical Specifications, Appendix A, Cisco uBR924 Router Hardware Installation Guide", 1-6, Mar. 1, 2000.
"HomePlug TM Powerline Alliance, HomePlug Initial Draft Medium Interface Specification", 111 pages, May 19, 2000.
"Hart Field Communication Protocol—an introduction for users and manufacturers", Hart Communication Foundation, 12 pages, Oct. 1, 1995.
Cisco Systems, "Catalyst 5000 Switching System", 1996, pp. 1-4.
Strassberg, Dan, "Home Automation Buses", Protocols Really Hit Home, EDN, 1-9, Apr. 13, 1995.
Russell, B. Don, "Communication Alternatives for Distribution Metering and Load Mangement", IEEE Transactions on Power Apparatus and Systems, vol. PAS-99, No. 4, pp. 1448-1455, Jul. 1, 1980.
"Cable Hardware and Software: uBR7200, uBR7100, uBR1OK, uBR905 FAQ, Document ID: 63990", 1-5, Sep. 3, 2006.
Hiroshi, Takeda, "Patent Abstracts of Japan", Japanese Publication No. 10200544 A2, (Matsushita Electric Works, Ltd.), 1, Jul. 31, 1998.

(56) References Cited

OTHER PUBLICATIONS

"Claim Chart presented in request for reexamination of U.S. Patent No. 5,841,360 request filed", 53 pages, May 26, 2009.
Diclementi, Domenic A. et al, "Electrical Distribution System Power Line Characterization" Copyrgt 1996, IEEE, pp. 271-276, Jan. 1, 1996.
International Telecommunication Union, "ISDN User-Network Interfaces—Primary Rate User-Network Interface—Layer 1 Specification", I.431, Mar. 1993, 44 pages.
"Tohoku Electric Develops High-Speed Communications System Using Power Distribution Lines" Tohoku Currents, Spring 1998, 8(1), 2 pages, Jan. 1, 1998.
3COM, "3ComImpact IQ External ISDN Modem User product brochure", pp. 1-4, Jun. 1, 1996.
"PowerDsine Product Catalogue" Israel, pp. 56-79 and 95-105, Jan. 1, 1999.
LonWorks Custom Node Development, LonWorks Engineering Bulletin, Echelon Corporation, 16 pages, Jan. 1, 1995.
Platt, Richard, "New Standard Helps Multimedia Get Off the Ground", IEEE Multimedia, vol. 3, Issue 2, Summer 1996, 78-82.
Dostert, K, "EMC Aspects of High Speed Powerline Communications", Proceedings of the 15.sup.th International Wroclaw Symposium and Exhibition on Electromagnetic Capability, Wroclaw, Poland, pp. 98-102, Jun. 27, 2000.
"Universal Serial Bus Specification Revision 1.0."Sec. 9.2.1-9.2.5.1 pp. 170-171, Jan. 15, 1996.
Cisco, "Cisco Catalyst 5000 Family Fast EtherChannel Switching Modules Data Sheets", 3 pages, Jan. 1, 1999.
"LonWorks Twisted Pair Control Module User's Guide Version 2", Echelon Corporation, 1992-1996, 50 pages, Jan. 1, 1996.
Ulm, John et al, Data-Over-Cable Interface Specifications/Radio Frequency Interface Specification, SP-RFII01-970326, 1-189, Mar. 26, 1997.
Wakerly, John, Clock Synchronization of DAVID Managers, D.A.V.I.D. Systems, Inc., pp. 1-8, Mar. 6, 1985.

"EMETCON Automated Distribution System, ABB Power T and D Company Inc.", Raleigh North Carolina, No. B-919A, 14 pages, Jan. 1, 1990.
United States International Trade Commission, Order No. 21: Construing the Terms of the Asserted Claims of the Patents at Issue (Public Version); In the Matter of Certain Equipment for Communications Networks, Including Switches, Routers, Gateways, Bridges, Wireless Access Points, Cable Modems, IP Phones, and Products Containing Same; ITC Investigation No. 337-TA-778, 148 pages, Feb. 14, 2012.
Dougligeris C. et al, "Communications and Control for a Home Automation System", Conference IEEE Proceedings of the Southeastcon '91, vol. 1, pp. 171-175, Jan. 1, 1991.
"DSLPipe User's Guide"; by Ascend Communications, 245 pages, Jun. 3, 1997.
"Serconet Ltd V Netgear Inc" Case No. CV-06-04646 PJH, Order Construing Claims, 1-27, Jul. 30, 2007.
Kilbourne, B, "EEI Electric Perspectives: The Final Connection", 7 pages, Jul. 1, 2001.
"Troubleshooting Tips for the Cisco uBR924 Cable Access Router, Cisco IOS Release 12.0(5) T", 1-74.
"Bridging and Routing Features for the Cisco uBR904 Cable Modem", 1-27.
"Cisco IOS Software Releases 12.0T Configuring the Cisco uBR900 Series Cable Access Routers", 1-103.
"Bridging and Routing Features for the Cisco uBR904 Cable Modem, Cisco IOS Release 12.0(3) T", 1-38.
Cisco Systems, "Catalyst 5000 Series", Cisco Systems, pp. 589-600, 1996.
"Troubleshooting Tips for the Cisco uBR904 Cable Modem, Cisco IOS Release 12.0(3)T", 1-62.
"Cisco 1-Port Euro/J-Docsis Cable High-Speed WAN Interface Card, Docsis Integration for Select Cisco Devices", 1-2.
Horowitz, Paul et al., Art of Electronics, Second Edition, Cambridge University Press, 1989, pp. 44, 45, 47, 48, 316-319.
"Troubleshooting Tips for the Cisco uBR904 Cable Modem", 1-39.

\* cited by examiner

| Node State | SW1 | SW2 | SW3 | SW4 |
|---|---|---|---|---|
| Right-to-left | OFF | ON | Don't Care | 3 |
| Left-to-right | ON | OFF | 1 | Don't Care |
| Transmit both sides | ON | ON | 2 | 1 |
| Receive both sides | OFF | OFF | Don't Care | Don't Care |
| Transmit right Receive left | ON | OFF | 2 | Don't Care |
| Transmit left Receive right | OFF | ON | Don't Care | 2 |
| Transmit/receive both sides | ON | ON | 2 | 2 |

FIG. 12.

LOCAL AREA NETWORK FOR DISTRIBUTING DATA COMMUNICATION, SENSING AND CONTROL SIGNALS

This is a continuation of parent application Ser. No. 11/438,259, filed May 23, 2006, itself a division of application Ser. No. 11/190,884, filed Jul. 28, 2005, now U.S. Pat. No. 7,200,152, issued Apr. 3, 2007, itself a continuation of application Ser. No. 09/349,020, filed Jul. 7, 1999, now U.S. Pat. No. 6,956,826, issued Oct. 18, 2005.

FIELD OF THE INVENTION

The present invention relates to the field of wired communication and control networks, and, more particularly, to local area networks and networks used for sensing, communication, and control.

BACKGROUND OF THE INVENTION

Local area networks (LANs) for distributing data communication, sensing, and control signals are often based on a "bus" topology, as shown in FIG. 1. Such a network 10 relies on shared electrically-conducting communication media 1, usually constituted by a twisted-pair of electrical conductors or a coaxial cable. Network data terminal equipment (DTE) units 5, 6, and 7 are connected via respective network adapters 2, 3, and 4 to communication media 1. Network adapters 2, 3, and 4 function as data communication equipment (DCE) units, and are tapped into communication media 1, forming parallel electric connections, and thereby interface between DTE units 5, 6, and 7 and communication media. Such network adapters are also commonly referred to as "NIC", an example of which is the Network Interface Card IEEE 802 (Ethernet). Such a topology is commonly used for connecting personal computers (PCs) in a network. Network adapters can be stand-alone units, integrated into the DTE unit or housed therewith in a common enclosure.

Control networks, interconnecting sensors, actuators, and DTE's also commonly use the same topology, such as the network described in U.S. Pat. No. 4,918,690 (Markkula, Jr. et al.) and shown in FIG. 2. In a network 20, network adapters 22, 23, and 24 function as DCE's, but are commonly referred to as "nodes". The payloads 25, 26, and 27 are composed of sensors, actuators, and DTE's.

Hereinafter, the term "node" is used for both control and data-communication applications.

A topology (such as bus topology) whose physical layer communication media employs multi-point connections, is not optimal for communication, and exhibits the following drawbacks:

1. The maximum length of the communication media is limited.
2. The maximum number of units connected to the bus is limited.
3. Complex transceivers are required in order to interface the communication media.
4. The data rate is limited.
5. Terminators are required at the communication media ends, thus complicating the installation.
6. At any given time, only single connected unit may transmit; all others are receiving.
7. In case of short circuit in the bus, the whole network fails. Localizing the fault is very difficult.

Despite these drawbacks, however, bus topology offers two unique advantages:

1. If the application requires "broadcast" data distribution, where the data generated by a given node must be distributed to all (or a majority of) the nodes in the network, network operation is very efficient. This is because only a single network operation is required (i.e., to establish which node is the transmitter). The broadcast data is received by all other nodes in the network in parallel without additional network overhead.
2. The broadcast message is received simultaneously by all receiving nodes in the network. This is important in real-time control applications, for example, where orderly operation of the units must be maintained.

The communication-related drawbacks described above are solved by networks constructed of multiple communication links, wherein each instance of the link communication media connects only two units in the network. Here, the physical layer in each segment is independent of other links, and employs a point-to-point connection. Data and/or messages are handled and routed using data-link layer control. One example of such system for LAN purposes is the Token-Ring, described in the IEEE 802 standard. An example of a corresponding control network is described in U.S. Pat. No. 5,095,417 to Hagiwara et al. Both networks use circular topology ("ring topology") as illustrated in FIG. 3. A network 30 interconnects nodes (or NIC's) 32, 33, and 34 by three separate cables 31A, 31B, and 31C, each connecting a pair of nodes and forming three distinct physical layer communication links. Payloads (or DTE's) 35, 36, and 37 are respectively connected to the appropriate nodes.

Both the Hagiwara network and the Token-Ring network use unidirectional communication in each communication link and require a circular topology. The PSIC network described in U.S. Pat. No. 5,841,360 to the present inventor teaches a similar network where the use of a circular topology is optional, and bi-directional communication (either half-duplex or full-duplex mode) is employed in the communication links.

The above-mentioned prior art patents and networks are representative only. Certain applications are covered by more than one issued patent. Additional discussion concerning the above-mentioned topologies can be found in U.S. Pat. No. 5,841,360 entitled. "Distributed serial control system" which issued Nov. 24, 1998 and co-pending U.S. patent application Ser. No. 09/123,486 filed Jul. 28, 1998, both in the name of the present inventor, and incorporated by reference for all purposes as if fully set forth herein.

Networks such as those illustrated in FIG. 3 typically use a "store and forward" mechanism, wherein the data received at a specific node is decoded at least to the data-link layer, and then re-encoded and transmitted to another point in the network as determined by the network control. This use of point-to-point communication links eliminates the communication drawbacks enumerated above in broadcast-based networks, but it lacks the two unique advantages of the broadcast technology, as also previously enumerated. Because the data is not inherently distributed throughout a network based solely on point-to-point communication links, such a network incurs a heavy overhead when broadcast is needed and exhibits delays in the propagation of messages. The overhead and delays result from the need to decode and re-encode messages at each node.

There is thus a widely-recognized need for, and it would be highly advantageous to have, a means of implementing a network which allows for both improved communication characteristics, while also supporting broadcast discipline and fast message distribution along the network.

SUMMARY OF THE INVENTION

It is an object of the present invention to provide a local area network in which at least some of the drawbacks described above are reduced or eliminated.

To this end, the present invention provides a local area network based on nodes connected to payloads. The nodes are interconnected to form a network of half-duplex or full-duplex communication links based on electrically conducting communication media such as twisted conductor pairs or coaxial cables. Each communication link interconnects two nodes in the network. Each node is capable of being dynamically configured as a transmitter or as a receiver. In addition, however, each receiving node can also be dynamically configured to be a repeater, which simply retransmits the received data. In this way, data from one link can be repeated to all other links via an automatic multicast process. In normal operation, a specific node is selected as the data generating unit to transmit data to the network. All other nodes serve as repeaters and receivers, and hence the data is multicast instantaneously from the selected data generating node throughout the network. After completing this transmitting session, another node may be selected as the data generating node, with all other nodes serving as repeaters and receivers in a like fashion.

A network according to the present invention can also be configured in a circular topology, enabling operation to continue even when there is a malfunction or loss of a communication link.

Therefore, according to the present invention there is provided a local area network for distributing data communication, sensing, and control signals, the local area network including at least three nodes having an operational mode and interconnected by at least two distinct communication links according, to a topology, wherein: (a) each of the communication links has at least two electrical conductors; (b) each of the communication links connects two of the nodes in a point-to-point configuration; (c) each of the communication links is operative to communicating in a half-duplex mode; (d) at least one of the nodes is connected to a payload; (e) at least two of the nodes have the operational mode selectable as a data-generating operational mode; (f) at least one of the nodes has the operational mode selectable as a repeating operational mode; and wherein the local area network has a state selectable from a group of at least two distinct states, wherein each state, is characterized by having a single selected one of the nodes in the data-generating operational mode, with the remainder of the nodes in operational modes selected from a group containing the receiving operational mode and the repeating operational mode.

BRIEF DESCRIPTION OF THE DRAWINGS

In order to understand the invention and to see how it may be carried out in practice, some preferred embodiments will now be described, by way of non-limiting example only, with reference to the accompanying drawings, in which:

FIG. 12 describes various possible node states, and the respective required switches states for a node as shown in FIG. 10.

DESCRIPTION OF THE PREFERRED EMBODIMENTS

Figure 1:
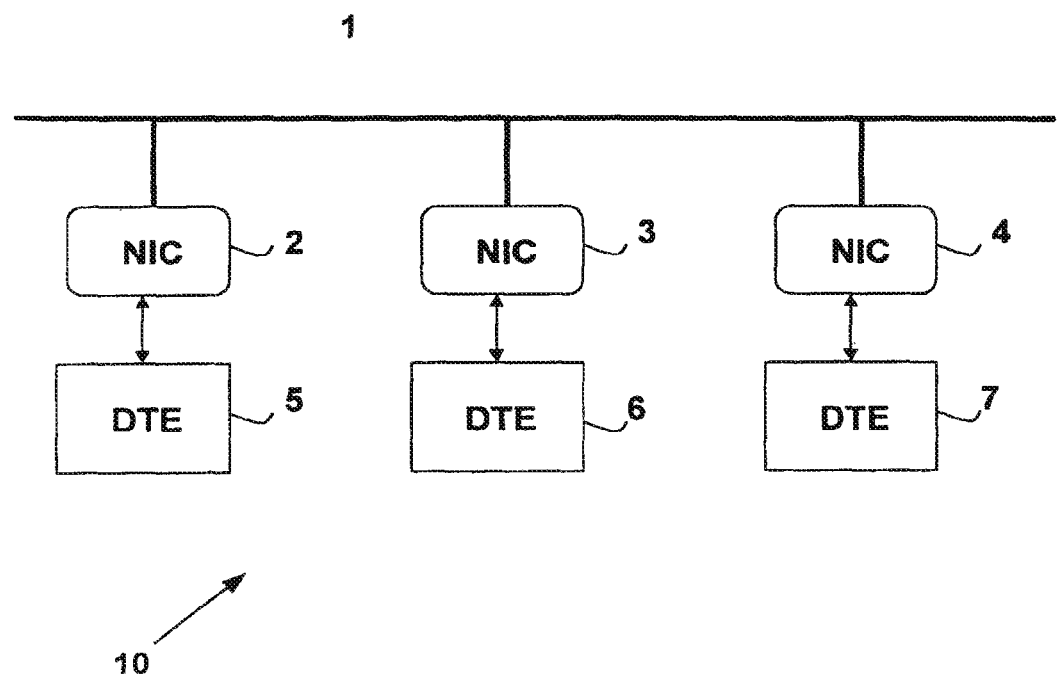
FIG. 1 shows a prior-art LAN for data communication, employing bus topology.
Figure 2:
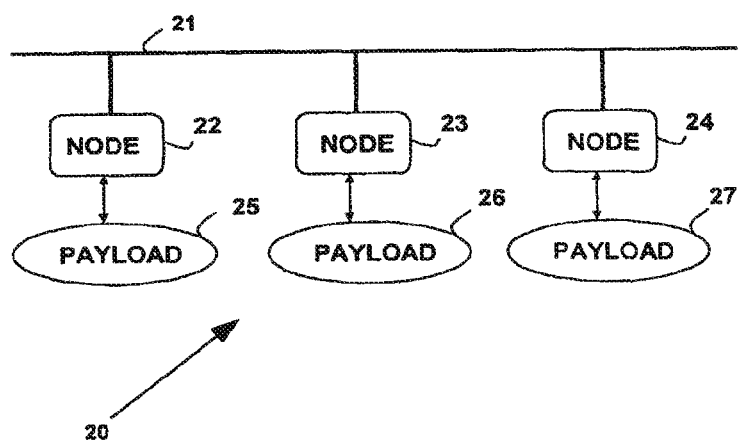
FIG. 2 shows a prior-art LAN for control, employing bus topology.
Figure 3:
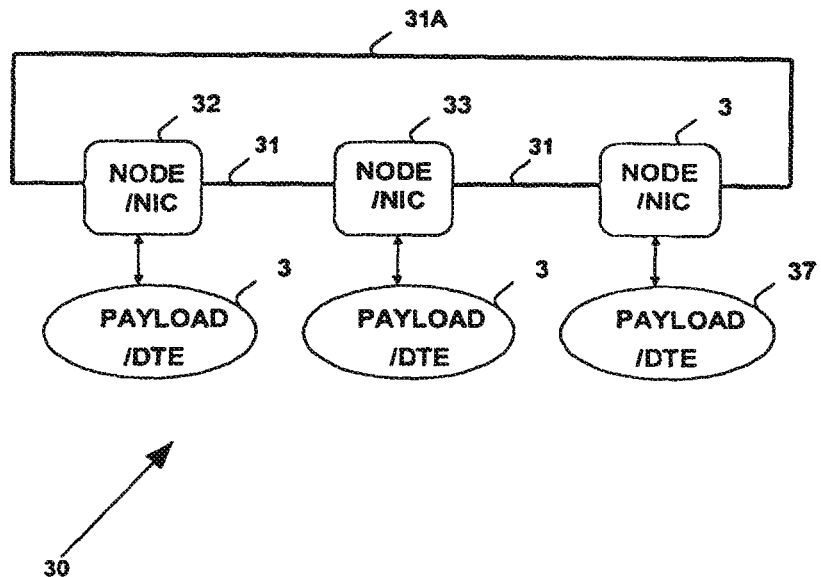
FIG. 3 shows a prior-art network for control or data-communication, employing circular topology.

The principles and operation of a network according to the present invention may be understood with reference to the drawings and the accompanying description. The drawings and descriptions herein are conceptual only. In actual practice, a single circuit can implement one or more functions; alternatively, each function can be implemented by a plurality of components and circuits. In the drawings and descriptions, identical reference numerals indicate those components that are common to different embodiments or configurations.

Figure 4:
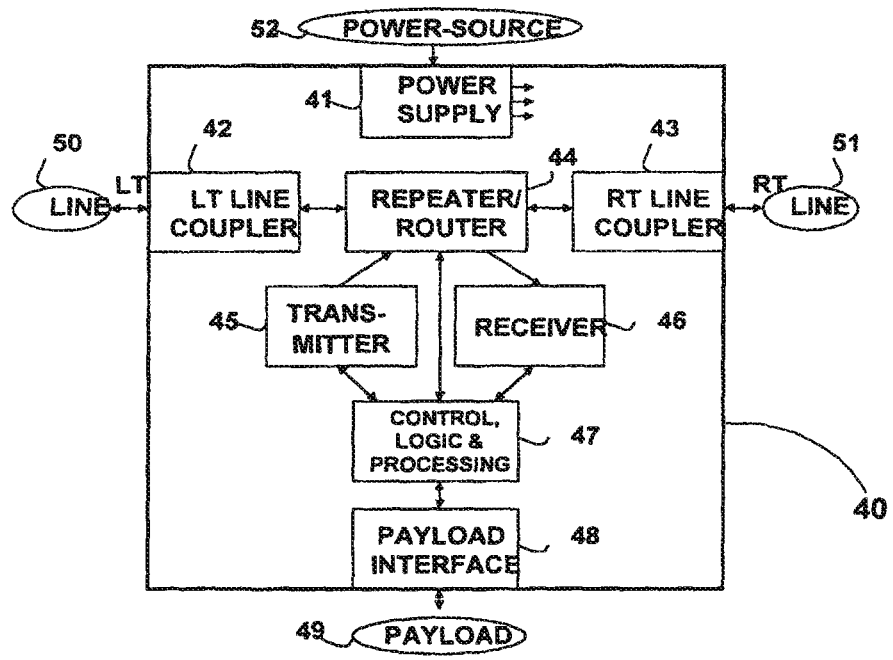
FIG. 4 describes a general block diagram of a node according to the present invention.

FIG. 4 schematically shows a node 40 according to the present invention. Node 40 contains the following functional blocks:

A power supply 41, fed from a power source 52, which converts incoming power to the voltage, or voltages, required by the node and the node's components. In addition, power supply 41 may also feed a payload 49 connected to node 40. If used, this feeding function is carried out by a payload interface 48. (For clarity, FIG. 4 omits the individual connections distributing power from power supply 41 to the power-consuming blocks of node 40.)

A payload interface 48 which adapts node 40 to a specific payload 49. Various payload types can be employed, such as sensors, actuators and data units, either analog or digital, functioning either as output or as input. For example:

Analog sensor. The payload consists of analog sensor used to measure any physical phenomena. In most cases, the payload interface contains an A/D converter.

Digital sensor. The payload is a switch, button, etc.

Analog actuator. In most cases, the payload contains a D/A converter controlling the parameters of the analog actuator.

Data related unit. In the case of digital communication, the payload consists of DTE and the payload interface contains a DTE interface.

Non-digital data. Data such as video, voice, analog communication or any other of data type. If analog data is input to the node, the payload interface is likely to use an A/D converter. The above examples are not intended to limit in any way the general payload definition. Furthermore, multiple devices of various types can be used. In some cases, payload 49 may use power from node 40. For example, the excitation voltage to analog sensor may be driven from the node power.

Some nodes in the network may not be connected to a payload, or may not have any payload interface at all. Nodes configured in this manner would be used as repeaters only, such as a node 90 in FIG. 8. Repeater nodes can be used, for example, to extend the distance between nodes beyond the regular limit.

Line couplers 42 and 43, which interconnect node 40 with up to two other nodes, each via communication media 50 and 51, respectively (also referred to as "lines"). Each communication media supports communication between two nodes of the network. For clarity only, the two ports are designated 'Left'-LT and 'Right'-RT. The right connection RT uses, line 51 and connects via RT line coupler 43. Similarly, the left connection LT uses line 50 and connects via LT line coupler 42. Neither line coupler 42 nor line coupler 43 affects the communication signal. Line couplers may include connectors, protection devices, isolation (e.g. transformer) and other required functions, which, are not normally associated with the communication signal itself.

A transmitter 45, which deals with the data to be transmitted, except for the physical layer functions (according to the OSI interconnection model). This block can be implemented in hardware (CRC generation circuitry, for example) by software, or by both hardware and software.

A receiver 46, which deals with the received data, except for the physical layer functions (according to the OSI interconnection model). This block can be implemented in hardware (CRC error detection circuitry, for example), by software, or by both hardware and software.

A control, logic, and processing unit 47, which controls and monitors node 40 and network operation. This block interconnects with the controlled blocks in node 40 (for clarity, some lines are omitted from FIG. 4). In addition, control, logic, and processing unit 47 can process data in the network, and also deals with the payload via payload interface 48. Control, logic, and processing unit 47 is furthermore in charge of shifting a repeater/router 44 from one state to another, as detailed below.

Repeater/router 44 deals with the physical layer characteristics of the communication signal. The repeater/router can be in various states, including a receive-only state and a transmit-only state. The signal is encoded and decoded, and is routed according to the control signals from control, logic, and processing unit 47. Detailed explanation of the repeater/router 44 follows.

A node can be stand-alone or integrated into the payload. For example, in the case of personal computer, the node can be housed within the computer enclosure as an add-on card.

Figure 5A:
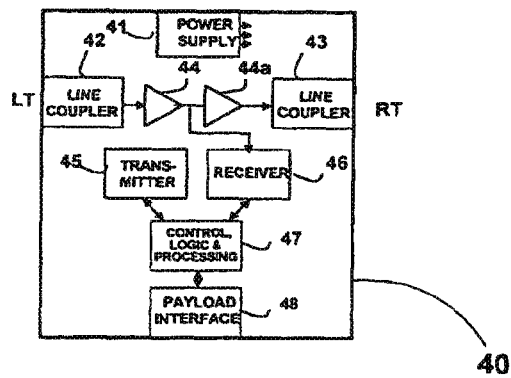
FIGS. 5*a*, 5*b*, 5*c*, and 5*d* show different possible states of a node according to the present invention.
Figure 5B:
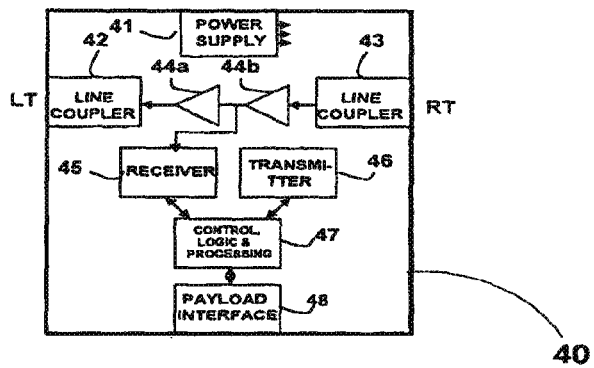

FIGS. 5a and 5b describe the various repeater/router functions by means of the possible states of a repeater/router during normal operation. As shown in FIG. 5a, repeater/router 44 contains two units connected in series. A line receiver 44b decodes the communication signal in the line into a digital signal which is fed to receiver 46 for analyzing the data-link and higher OSI layers. The digital signal is then fed to a line driver 44a which encodes the communication signal again. The pair consisting of line receiver 44b and line driver 44a thus form a communication signal repeater which performs a transparent routing of the communication signal from 'left' to 'right'. The delay between input and output is negligible, in the order of nano-seconds or micro-seconds.

Similarly, FIG. 5b allows for a routing from 'right' to 'left'. The direction of repeater/router 44 is controlled by control, logic, and processing unit 47, via control lines (omitted for clarity from FIG. 5).

Figure 5C:
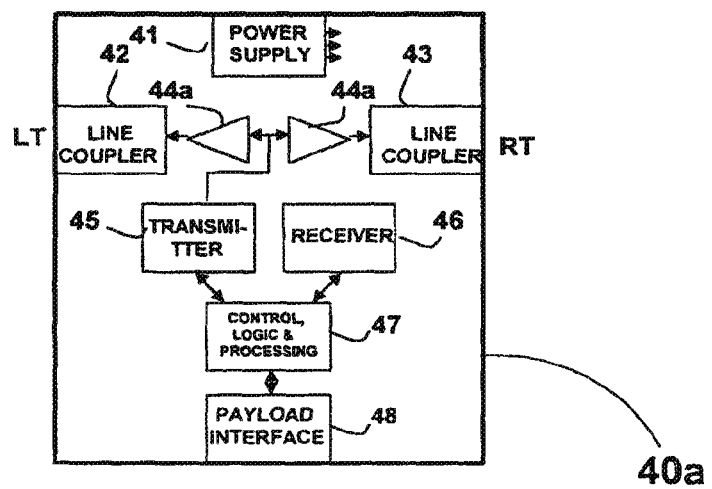
Figure 5D:
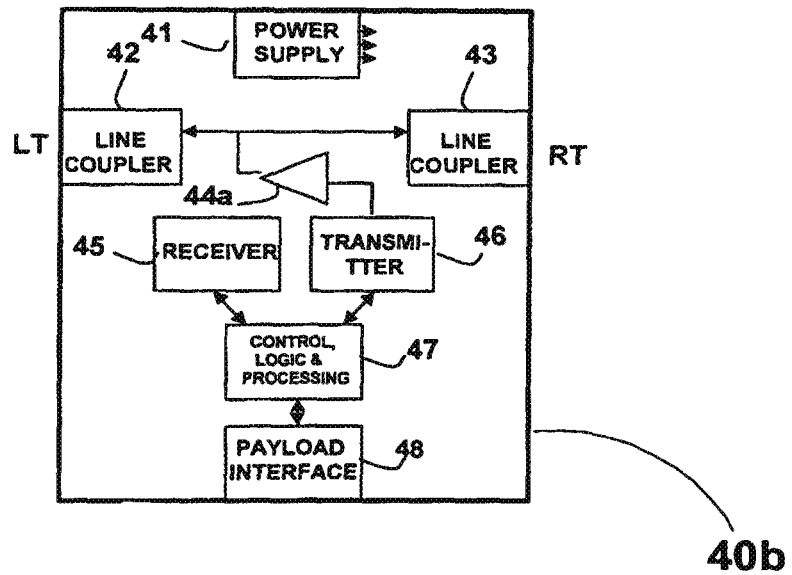

Whereas FIGS. 5a and 5b describe a node which does not generate any data (but only receives and transfers the data in the network), FIGS. 5c and 5d illustrate nodes in the transmitting state. In both cases, the node transmits data to both the right and left connections via the respective line coupler. In FIG. 5c, two line drivers 44a are used, one for each direction. In FIG. 5d, a single line driver 44a is used, driving both directions from a single unit. Both embodiments can be used interchangeably. In most cases, the line driver and line coupler characteristics will be the basis for selecting one configuration in preference over the other. For example, if the line driver is capable of driving a single line only, the configuration of FIG. 5c should be used.

Figure 6:
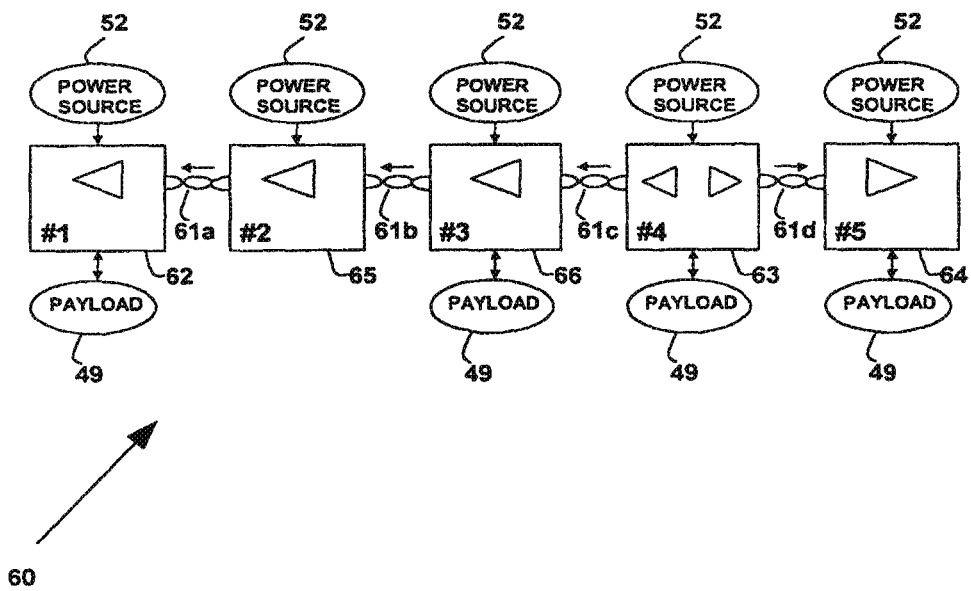
FIG. 6 shows a state of a network according to the present invention.

FIG. 6 shows a network 60 according to the present invention. Electrically-conducting communication media of lines 61a, 61b, 61c, and 61d are used to interconnect the nodes. At least two conductors are used in the communication media. For example, coaxial cables or copper twisted-pairs may be used. For clarity only, the figures herein illustrate the use of a single twisted-pair in non-limiting examples.

Nodes 62, 63, 64, 65 and 66 are all the based on node 40 as described previously. Nodes 62, 65, and 66 are, in 'Right to Left' state as illustrated in FIG. 5b, whereas node 64 is in 'Left to Right' state, as illustrated in FIG. 5a. Node 63 is the data generating node as in FIGS. 5c and 5d. The network in FIG. 6 shows one possible state of the network, wherein node 63 is the data-generating node, while all other nodes serve as receivers and repeaters, receiving the data and re-transmitting the data to the next sequential node. In order to support dynamic reconfiguration, nodes can simultaneously have more than one operational mode. In a non-limiting fashion, a node can have:

a data-generating operational mode, wherein a node functions as a source of data, and transmits this data to other nodes;

a receiving operational mode, wherein the node receives data from, another node; and a repeating operational mode, wherein the node functions as a repeater of data received from one given node by re-transmitting this data to another given node.

While the network is functioning, the current operational mode of a node is selectable from the available operational modes. Some operational modes may be mutually exclusive, while others may be selected simultaneously. For example, the data-generating operational mode is exclusive of the repeating operational mode, whereas the receiving operational mode may be selected at the same time as the repeating operational mode.

In most applications, more than one node can serve as a data-generating node at different times. In such a case, the network states will be changed as a function of time according to predetermined logic and control, in order to allow each data generating node an opportunity to transmit. However, no more than a single node can serve as data-generating node at a time. While a node is serving as data-generating node, all other nodes states are accordingly set to be repeaters and/or receivers, to allow for data distribution along the network. Nodes located 'left' of the data generating node will be in a 'right to left' state, while nodes located 'right' of the data-generating node will be in a 'left to right' state.

It should be clear that, whereas the nodes at the network ends, the 'left-most' node 62 and the 'right-most' node 64 could use the same structure as shown in FIG. 4 (and can be implemented in the same way as all other nodes in the network), the end nodes utilize only single line connection. Thus, these end nodes can be implemented using a single line coupler and single line driver.

It should also be clear that one or more of the nodes in the network need not be connected to a payload, as is illustrated for node 65 in FIG. 6. This may be the case where the attenuation in the line is too high (e.g. a line is too long), and a node serves mainly as a repeater. In such a case, payload interface 48 would not be required.

Network Powering.

Figure 8:
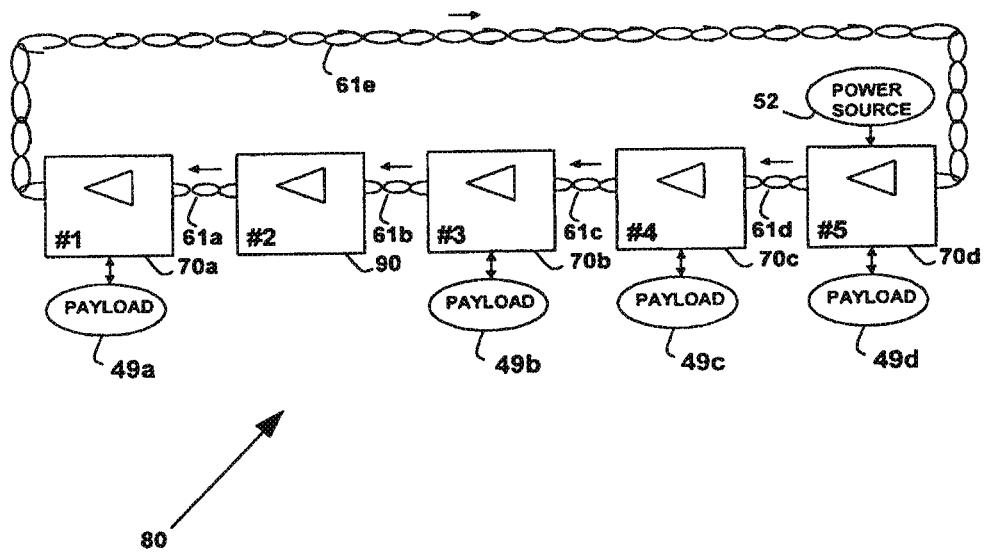
FIG. 8 shows a state of a network according to the present invention, wherein power is carried by the network and employing circular topology.

FIG. 6 illustrates a network wherein each node is locally powered by a local power source 52, which supplies electrical power for, operating the components of the network. Alternatively, the network communication media can be used for power distribution. In one embodiment of the present invention, the power is distributed via dedicated lines, such as by the use of two additional wires within the same cable. In a preferred embodiment, the same wires can be used for both data communication and power distribution. The latter configuration is described in co-pending U.S. patent application Ser. No. 09/141,321, filed by the present inventor on Aug. 27, 1998, which is applicable to the network discussed herein and incorporated by reference. FIG. 8 illustrates such a network, allowing for single power-supply to be used for powering the whole network.

Figure 7:
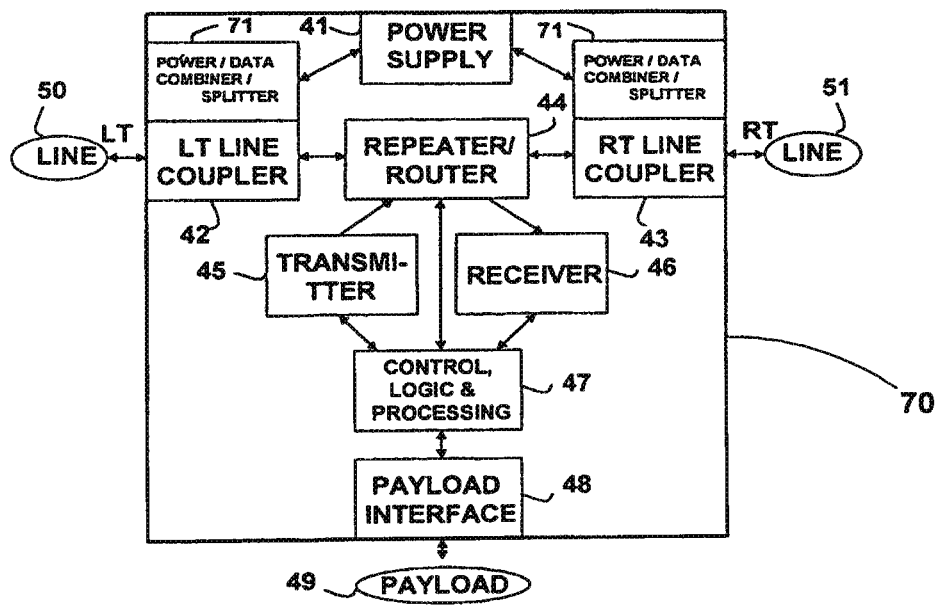
FIG. 7 shows a general block diagram of a node according to the invention, wherein power is also carried by the network.

When the same wires are used for both communication and power, the node 40 should be modified to include a power/data combiner/splitter 71 as shown in FIG. 7. A node 70 is shown with two power/data combiner/splitters 71 coupled to line couplers 42 and 43. A node such as node 70 can receive power from either the left or the right sides or from both sides, and carry the power to the non-powered side. Being powered from the network, no power source interface will be usually supported for such a configuration. The power source feeding the network can connect thereto via dedicated couplers or via one or more of the nodes, modified to support such capability.

Circular Topology.

Figure 9A:
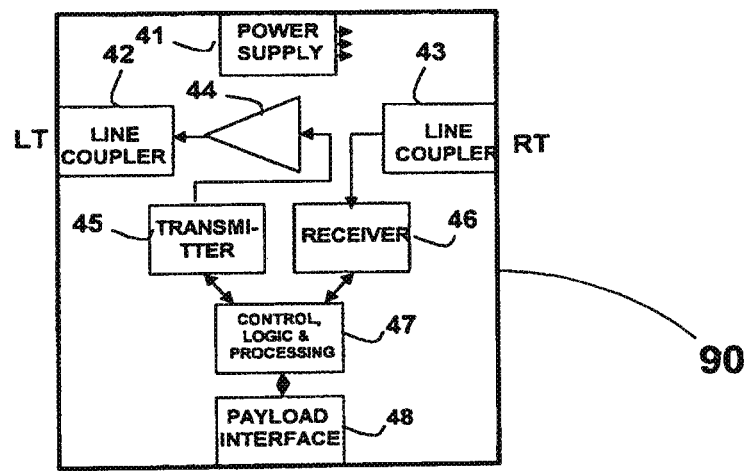
FIGS. 9*a* and 9*b* show different possible states of a node in circular topology network according to the present invention.
Figure 9B:
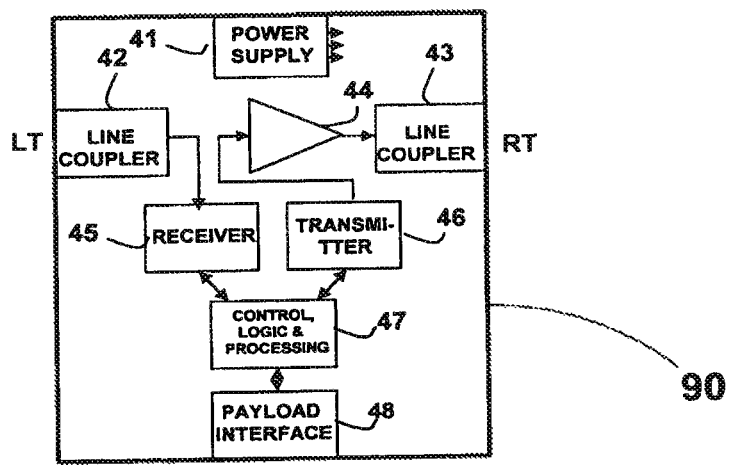

While the foregoing description applies the present invention to a linear topology, the present invention can also be implemented using a circular topology for 'ring' type networks. In one embodiment, both ends of the network are connected to a node which is configured to receive from both sides, hence including two receivers. However, FIG. 8 shows a preferred embodiment of a network 80. In network 80, all nodes except the data-generating node are configured to the transparent repeater state, either uniformly 'right-to-left' or uniformly 'left-to-right'. A node 90 in the data-generating state is modified as illustrated in FIGS. 9a and 9b. Node 90 can transmit to one side and receive from the other. In FIG. 9a node 90 can transmit to the left side and receive from the right side. Similarly, in FIG. 9b node 90 can transmit to the right side and receive from the left side. Either state can be used in circular topology. In FIG. 8, node 90 is in the state shown in FIG. 9a. Alternatively, node 90 can be in the state shown in FIG. 9b. All other nodes of FIG. 8 are, configured in the 'right-to-left' direction. In both cases, the data-generating node 90 transmits to one side and receives from the other. The receiving functionality of node 90 can be used for monitoring the network, to insure that the data path is available and is error-free. However, this receiver functionality is an option only, and does not have to be implemented.

For compactness, FIG. 8 demonstrates both the power feeding via the network and the circular topology together, but these features are independent and may be implemented separately.

Network Control.

As described above, the operation of the network (either bus or circular topology) switches from state to state. Each state is characterized by having a specific node functioning as data-generating node at a time, while all other nodes serve as repeaters and receivers, routing the data coming from the data-generating node. Hence, there is a need for a network controller to determine which node in the network will be the data-generating node.

Various techniques can be used to implement such a network controller. The network controller can select nodes sequentially, by means of token passing from node to node (similar to that of the Token-Ring network). The network controller can be external to the network, using dedicated communication media. Preferably, the network controller will be embedded and will manage the network states via signals transported by the network itself. In most cases, each node should be allocated an address, enabling data routing in the network from arbitrary node to arbitrary node.

Another popular method of network discipline is 'master/slave' operation. In another embodiment of the present invention, one of the nodes will be designated as the master node. In the initial state, this node serves as the data-generating node, and while in this state directs other nodes to transmit. During the following state the selected node will serve as the data-generating node. This two-state sequence will be repeated, with a different node selected to be the data-generating node in each subsequent cycle, according to predetermined logic or under external control.

Dual Discipline Network.

The network taught by U.S. Pat. No. 5,841,360 to the present inventor, herein referred to as the "PSIC Network", employs multiple communication links, independent of each other. Such a network supports several features which are not available in the previously-described network, such as automatic addressing, fault localization, and circular topology redundancy in the case of single failure.

In order to exploit the benefits of both these network types it is possible to construct a network which supports both disciplines, and can be controlled to be either in one discipline or in the other. For example, the network may start as PSIC Network. During this start-up period, automatic addressing and fault localization will be performed. Thereafter, the network may configure itself to work according to this application or may use time-sharing and alternately switch between both configurations.

Figure 10:
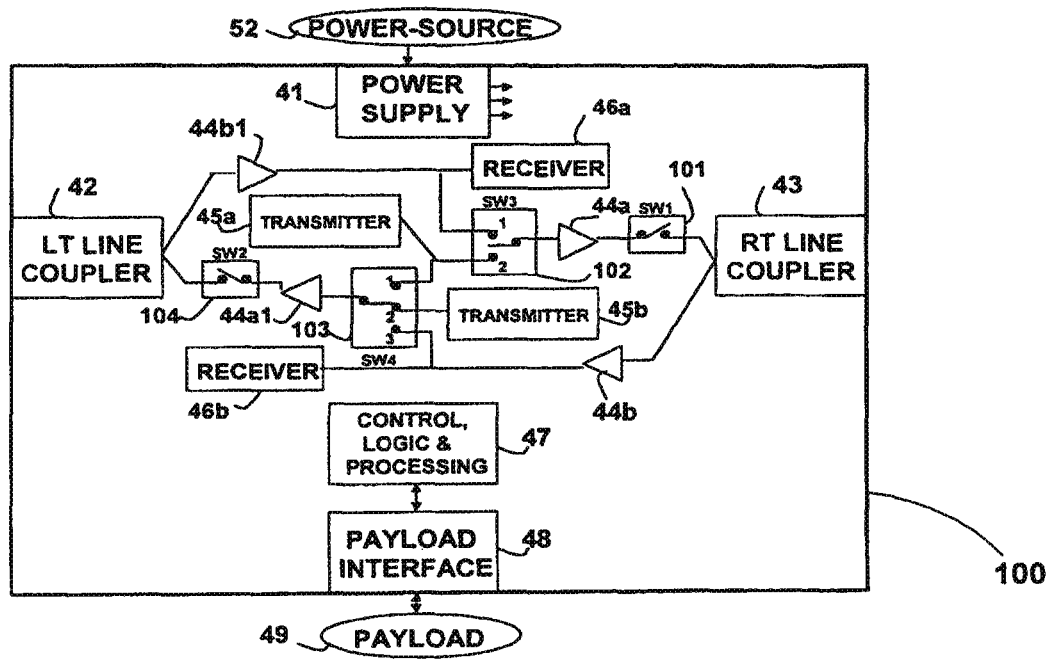
FIG. 10 shows a block diagram of a node according to a preferred embodiment.

FIG. 10 shows a schematic view of a node 100 which is capable of both roles. The state of node 100 is determined by switches 101, 104, 102, and 103, designated SW1, SW2, SW3 and SW4 respectively. These switches are controlled by control, logic, and processing unit 47. Node 100 employs transmitters 45a and 45b, as well as receivers 46a and 46b. Line driver 44a serves the right port, while line driver 44a1 serves the left connection. Similarly, line receivers 44b and 44b1 are connected to the right and left interfaces respectively.

FIG. 12 lists the various possible node states for node 100 (FIG. 10). The states in FIG. 12 are given in a Node State column, and the switch settings are given in SW1, SW2, SW3, and SW4 columns. In a 'Right-to-left' state, data received in the right port is handled by line receiver 44b and fed to line receiver 46b. Simultaneously, the received data is fed to line driver 44a1, which transmits to the left side. Thus, the functionality shown in FIG. 5b is obtained. In a similar way, the 'Left-to-right' state is implemented to achieve a functionality as shown in FIG. 5a. In the latter case, line receiver 46a is the active one.

In the 'transmit both sides' state, transmitter 45a transmits to both ports using line drivers 44a and 44a1, implementing the functionality shown in FIG. 5c. In the 'receive both sides' state, each receiver is connected to single line coupler, and no line driver is activated. This is expected to be the state when the network is idle or as an interim state while switching between states, in order to avoid data collisions caused by two or more transmitters active over the same link.

The 'transmit right receive left' state reflects the state shown in FIG. 9b. Similarly, the 'transmit left receive right' state reflects, the functionality shown in FIG. 9a.

In the 'transmit/receive both sides' state, the node can receive and transmit in both interfaces simultaneously, thus implementing the full PSIC Network functionality.

Nodes with More than Two Line Connections

Figure 11:
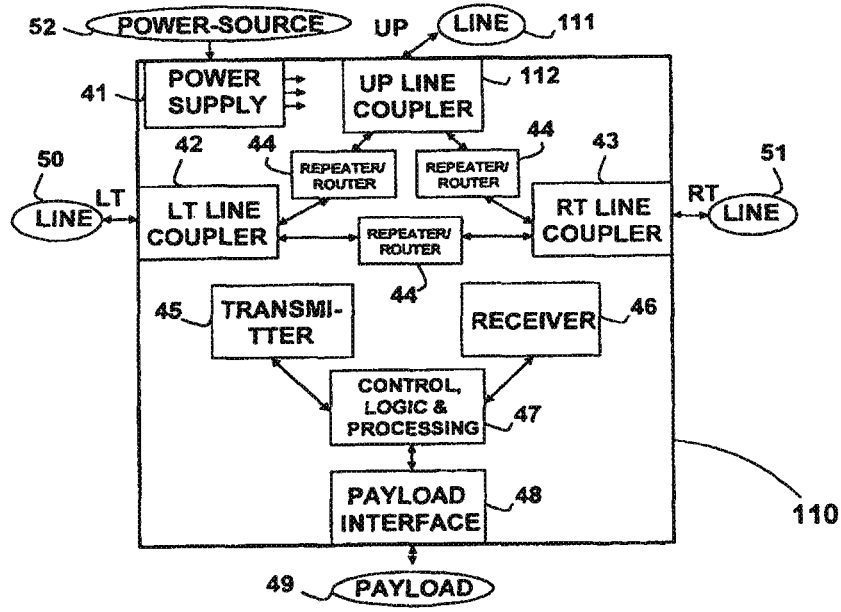
FIG. 11 shows a block diagram of a node according to the present invention, supporting three line couplers.

Whereas the foregoing discussion describes a node having two line couplers (which may be reduced to single interface in the case of an end-unit in a network employing 'bus' topology), it is obvious that three or more such interfaces could also be used. In such a case, at least one additional repeater/router must be added for each additional interface. For example, FIG. 11 illustrates a node 110 having three interfaces, where an additional interface is designated as 'up', and uses a line coupler 112 for interfacing to a line 111. In order to support the interconnection between all three ports, three repeater/router units 44 are used, each constructed as described previously and suitable for connecting two ports. In some applications, where the connectivity requirements can be reduced, any two out of the three ports may be used.

Similarly, additional interfaces can be used. Furthermore, a network can employ nodes of different interface capacities, which can be freely connected to construct a network of arbitrary topology. In all, cases, the basic rule that each communication link connect only two nodes must be observed. Furthermore, the network logic embedded in the nodes has to insure that no more than a single node generates data, while all others must be in the transparent repeater/router state, directed from the data-generating node.

Implementation.

Implementing any of the above schemes is straightforward for anyone skilled in the art. In one embodiment, RS-485 (EIA-485) is employed for the physical layer. In such a case, line driver 44a and line receiver 44b are directly implemented using a common RS-485 line driver or line receiver, respectively. Similarly, the switches illustrated in FIG. 10 can be implemented using manually-activated switches, relays, analog switches, or digital switches/multiplexers. Except in the case of manual switches, switching is controlled electronically.

Repeaters and regenerators are known in both prior-art WAN (Wide Area Network) and LAN (Local area network) systems, mainly for the purpose of allowing operation over lengthy connections. However, there are major differences between those networks and the present invention. First, most prior-art repeaters employ single input and single output. The present invention allows for multiple ports. Second, prior-art repeaters are unidirectional, while the present invention is not restricted to a specific direction of data flow. Additionally, the present invention requires a control mechanism (a network controller) for determining the data flow direction, whereas prior-art systems, being unidirectional, do not require such control. In most prior-art networks, units in the network can be clearly defined as either payload-associated units or dedicated repeaters. Such a distinction is not valid when implementing a network according to the present invention, since, each payload-associated unit in the network also includes the repeater functionality.

Although a network according to the present invention, when configured in circular topology, can be superficially similar to a Token-Ring network, there are major differences between them. In a Token-Ring network, there is a single constant direction of data flow. The present invention does not impose single direction of data flow, but the flow may change as part of the network operation. In addition, in Token-Ring networks the data-generating unit is sequentially allocated according to the network topology. In the present invention, the data-generating node need not be chosen according to any specific rule, although sequential selection of the data-generating node is possible.

While the invention, has been described with respect to a limited number of embodiments, it will be appreciated that many variations, modifications and other applications of the invention may be made.

What is claimed is:

1. A device for coupling a video signal onto, and for being powered from, a Local Area Network (LAN) cable concurrently carrying a power signal and a serial digital data signal over said LAN cable in a full-duplex communication, the device comprising:
    a LAN connector for connecting to the LAN cable;
    a video port for receiving a video signal;
    a LAN transceiver for communication in a full-duplex serial digital data signal over said LAN cable, the LAN transceiver being coupled between said LAN connector and said video port for transmitting the video signal in said serial digital data signal;
    a firmware and a processor executing said firmware, wherein said processor is coupled to said LAN transceiver for controlling said LAN transceiver;
    a power supply for voltage conversion coupled to said LAN transceiver and powered only from said power signal, the power supply connected for powering said LAN transceiver and said processor;
    a single enclosure housing said LAN connector, said video port, said LAN transceiver, said firmware and said processor; and
    a power/data splitter having first, second and third ports, said splitter being configured so that only the power signal is passed from said first port to said second port, and only the digital data signal is passed between said first and third ports, and wherein said power/data splitter is connected between said LAN transceiver, said power supply and said LAN connector, wherein said first port is coupled to said LAN connector; said second port is coupled to said power supply; and said third port is coupled to said LAN transceiver,
    wherein said device is addressable in the LAN.

2. The device according to claim 1, wherein said device has a manually assigned address.

3. The device according to claim 1, wherein said device has an automatically assigned address.

4. The device according to claim 3, wherein said device has an address assigned by a data unit coupled via the LAN.

5. The device according to claim 1, wherein said communication over said LAN cable is a point-to-point communication.

6. The device according to claim 5, wherein said LAN transceiver is operative for communication with a single mating LAN transceiver of the same type over said LAN cable.

7. The device according to claim 6, wherein said communication over said LAN cable is packet based.

8. The device according to claim 7, wherein said communication over said LAN cable is Ethernet-based.

9. The device according to claim 1, wherein said video port is a video connector.

10. The device according to claim 9, wherein said video port is an analog video connector.

11. The device according to claim 1, wherein the power signal is carried over said LAN cable using dedicated wires.

12. The device according to claim 1, wherein said video signal is an analog video signal, and wherein said device further comprises an analog to digital converter coupled between said video port and said LAN transceiver for converting the analog video signal to a digital form.

13. The device according to claim 1 further operative for sensing a physical phenomenon, wherein the device further comprises an analog port for coupling to receive an analog signal from an analog sensor for sensing the physical phenomenon, and said device further comprises an analog to digital converter coupled between said analog port and said LAN transceiver for converting the analog signal to a digital signal for transmission in said serial digital data signal.

14. The device according to claim 13, wherein the analog sensor is an audio device, said analog signal is an analog audio signal, and said digital signal contains digitized audio.

15. The device according to claim 14, wherein said analog port is an analog connector.

16. The device according to claim 14, wherein said analog port is an analog audio connector.

17. The device according to claim 14, wherein said analog port is further coupled to said power supply for powering the analog sensor from said power signal.

18. The device according to claim 1 further operative for producing a physical phenomenon, wherein the device further comprises an analog port for coupling an analog signal to an analog actuator for producing the physical phenomenon, and wherein said device further comprises a digital to analog converter coupled between said analog port and said LAN transceiver for converting a digital signal from said serial digital data signal to an analog signal.

19. The device according to claim 18, wherein the analog actuator is an audio device, said analog signal is an analog audio signal, and said digital signal contains digitized audio.

20. The device according to claim 19, wherein said analog port is an analog connector.

21. The device according to claim 20, wherein said analog port is an analog audio connector.

22. The device according to claim 18, wherein said analog port is further coupled to said power supply for powering the analog actuator from said power signal.

23. The device according to claim 1, further comprising in said single enclosure a data port coupled to said LAN transceiver and connectable to a data unit for coupling the data unit to the serial digital data signal.

24. The device according to claim 23 wherein:
the data unit is a wired digital data unit;
said data port comprises a digital data connector connectable to the wired digital data unit; and
said device further comprises a further transceiver coupled between said LAN transceiver and said digital data connector for bi-directional digital data communication with the wired digital data unit.

25. The device according to claim 24 wherein the communication with the wired digital data unit is standard full duplex serial communication.

26. The device according to claim 25 further operative to power the data unit, wherein said data port is coupled to said power supply for powering the connected data unit therefrom.

27. The device according to claim 1 further comprising a transformer connected between said LAN transceiver and said LAN connector for passing said serial digital data signal and for isolating said power signal.

28. The device according to claim 1, wherein the power signal and the digital data signal are carried over said LAN cable using the same wires.

29. A device for coupling an audio signal onto, and for being powered from, a Local Area Network (LAN) cable concurrently carrying a power signal and a serial digital data point-to-point communication signal, the device comprising:
a LAN connector for connecting to the LAN cable;
an audio port for receiving a audio signal;
a LAN transceiver for point-to-point communication in a serial digital data signal over said LAN cable, the LAN transceiver being coupled between said LAN connector and said audio port for transmitting the audio signal in said serial digital data signal;
a firmware and a processor executing said firmware, wherein said processor is coupled to said LAN transceiver for controlling said LAN transceiver;
a power supply for voltage conversion coupled to said LAN transceiver and powered only from said power signal, the power supply connected for powering said LAN transceiver and said processor;
a single enclosure housing said LAN connector, said audio port, said LAN transceiver, said firmware and said processor; and
a power/data splitter having first, second and third ports, said splitter being configured so that only the power signal is passed from said first port to said second port, and only the digital data signal is passed between said first and third ports, and wherein said power/data splitter is connected between said LAN transceiver, said power supply and said LAN connector, wherein said first port is coupled to said LAN connector; said second port is coupled to said power supply; and said third port is coupled to said LAN transceiver,
wherein said device is addressable in the LAN.

30. The device according to claim 29, wherein said device has a manually assigned address.

31. The device according to claim 29, wherein said device has an automatically assigned address.

32. The device according to claim 31, wherein said device has an address assigned by a data unit coupled via the LAN.

33. The device according to claim 29, wherein said communication over said LAN cable in a full-duplex communication.

34. The device according to claim 33, wherein said LAN transceiver is operative for communication with a single mating LAN transceiver of the same type over said LAN cable.

35. The device according to claim 34, wherein said communication over said LAN cable is packet based.

36. The device according to claim 35, wherein said communication over said LAN cable is Ethernet-based.

37. The device according to claim 29, wherein said audio port is an audio connector.

38. The device according to claim 37, wherein said audio port is an analog audio connector.

39. The device according to claim 29, wherein the power signal is carried over said LAN cable using dedicated wires.

40. The device according to claim 29, wherein said audio signal is an analog audio signal, and wherein said device further comprises an analog to digital converter coupled between said audio port and said LAN transceiver for converting the analog audio signal to a digital form.

41. The device according to claim 29 further operative for sensing a physical phenomenon, wherein the device further comprises an analog port for coupling to receive an analog signal from an analog sensor for sensing a physical phenomenon, and said device further comprises an analog to digital converter coupled between said analog port and said LAN transceiver for converting the analog signal to a digital signal for transmission in said serial digital data signal.

42. The device according to claim 41, wherein the analog sensor is a video device, said analog signal is an analog video signal, and said digital signal contains digitized video.

43. The device according to claim 41, wherein said analog port is an analog connector.

44. The device according to claim 41, wherein said analog port is an analog video connector.

45. The device according to claim 41, wherein said analog port is further coupled to said power supply for powering the analog sensor from said power signal.

46. The device according to claim 29 further operative for producing a physical phenomenon, wherein the device further comprises an analog port for coupling an analog signal to an analog actuator for producing the physical phenomenon, and wherein said device further comprises a digital to analog converter coupled between said analog port and said LAN transceiver for converting a digital signal from said serial digital data signal to an analog signal.

47. The device according to claim 46, wherein the analog actuator is a video device, said analog signal is an analog video signal, and said digital signal contains digitized video.

48. The device according to claim 46, wherein said analog port is an analog connector.

49. The device according to claim 46, wherein said analog port is an analog video connector.

50. The device according to claim 46, wherein said analog port is further coupled to said power supply for powering the analog actuator from said power signal.

51. The device according to claim 29, further comprising in said single enclosure a data port coupled to said LAN transceiver and connectable to a data unit for coupling the data unit to the serial digital data signal.

52. The device according to claim 51, wherein:
the data unit is a wired digital data unit;
said data port comprises a digital data connector connectable to the wired digital data unit; and
said device further comprises a further transceiver coupled between said LAN transceiver and said digital data connector for bi-directional digital data communication with the wired digital data unit.

53. The device according to claim 52, wherein the communication with the wired digital data unit is standard full duplex serial communication.

54. The device according to claim 53 further operative to power the data unit, wherein said data port is coupled to said power supply for powering the connected data unit therefrom.

55. The device according to claim 29 further comprising a transformer connected between said LAN transceiver and said LAN connector for passing said serial digital data signal and for isolating said power signal.

56. The device according to claim 29, wherein the power signal and the digital data signal are carried over said LAN cable using the same wires.

* * * * *